United States Patent
Pelly

(10) Patent No.: US 6,636,107 B2
(45) Date of Patent: Oct. 21, 2003

(54) ACTIVE FILTER FOR REDUCTION OF COMMON MODE CURRENT

(75) Inventor: Brian R. Pelly, Palos Verdes Estates, CA (US)

(73) Assignee: International Rectifier Corporation, El Segundo, CA (US)

( * ) Notice: Subject to any disclaimer, the term of this patent is extended or adjusted under 35 U.S.C. 154(b) by 0 days.

(21) Appl. No.: 09/816,590

(22) Filed: Mar. 23, 2001

(65) Prior Publication Data

US 2001/0045863 A1 Nov. 29, 2001

Related U.S. Application Data

(60) Provisional application No. 60/192,976, filed on Mar. 28, 2000, and provisional application No. 60/211,999, filed on Jun. 16, 2000.

(51) Int. Cl.[7] .................................................. H03K 5/00
(52) U.S. Cl. ........................... 327/552; 363/37; 363/47; 363/40
(58) Field of Search ................................ 327/551, 552, 327/311; 363/48, 37, 40, 46, 47

(56) References Cited

U.S. PATENT DOCUMENTS

| 4,159,499 A | 6/1979 | Bereskin ........................ 361/42 |
| 4,351,022 A | 9/1982 | Lovelace et al. ............. 363/87 |
| 4,709,233 A | * 11/1987 | Duval ........................ 327/384 |

(List continued on next page.)

FOREIGN PATENT DOCUMENTS

| EP | 0780960 | 6/1997 |
| EP | 0809346 | 11/1997 |
| EP | 0921626 | 9/1999 |
| JP | 9-266677 | 10/1997 |
| JP | 1162686 | 6/1999 |
| JP | 1178327 | 7/1999 |
| JP | 0032743 | 1/2000 |

OTHER PUBLICATIONS

Ogasawara, S. Akagh, H., "Modeling and Damping of High–Frequncy Leakage Current PWM Inverter–Fed AC Motor Drive Systems", IEEE Trans. Ind. Applicat., vol. 32 Issue: 5 Sep./Oct. 1996 [Abstract] Full Text pp.1105–1113.

IBM Technical Disclosure Bulletin, "Latch Circuit" Aug. 1962 p. 47.

IBM Technical Disclosure Bulletin, "Analysis of Current–Injected Controlled Multi–Output Switching Converters" Aug. 1990, pp. 58–61.

IBM Technical Disclosure Bulletin, "Differential Current Sensing System For Diagnostic Purposes" Jan. 1981, pp. 3660–3662.

(List continued on next page.)

Primary Examiner—Dinh T. Le
(74) Attorney, Agent, or Firm—Ostrolenk, Faber, Gerb & Soffen, LLP

(57) ABSTRACT

An active filter reduces the common mode current in the ground wire of a PWM controlled motor drive circuit. The active filter is, in part, integrated into an integrated circuit chip and contains a buffer amplifier which drives two junction type or MOSFET transistors linearly to divert common mode current from a ground wire and through the transistors. The transistors are connected between positive and negative d-c busses which supply d-c power to a PWM inventor which drives an a-c motor, producing the common mode ground current in its grounded frame. A current transformer monitors the common mode current and its output is coupled to the input of the buffer amplifier to control the transistors. An internal power supply for the amplifiers is formed at the nodes between two current sources and two zener diodes which are connected between the d-c bus conductors. Headroom control circuits are disclosed to insure sufficient headroom voltage for each of the transistors under all input a-c voltage conditions.

106 Claims, 18 Drawing Sheets

U.S. PATENT DOCUMENTS

| | | |
|---|---|---|
| 4,833,377 A | 5/1989 | Volk, Sr. et al. ............. 318/747 |
| 4,849,950 A | 7/1989 | Sugiura et al. ................ 363/48 |
| 4,888,675 A | 12/1989 | Kumar et al. .................. 363/47 |
| 5,179,362 A | 1/1993 | Okochi et al. ............... 333/181 |
| 5,343,079 A | 8/1994 | Mohan et al. ............... 307/105 |
| 5,574,398 A | 11/1996 | Hagino et al. ............... 327/557 |
| 5,630,220 A | 5/1997 | Yano ........................ 455/234.1 |
| 5,672,102 A | 9/1997 | Herald ........................ 454/184 |
| 5,748,459 A | 5/1998 | Yamada et al. ................ 363/21 |
| 5,831,842 A | 11/1998 | Ogasawara et al. ........... 363/40 |
| 5,905,642 A | 5/1999 | Hammond ................... 363/37 |
| 5,936,856 A | 8/1999 | Xiang .......................... 363/98 |
| 5,982,106 A | 11/1999 | Bobel ..................... 315/209 R |
| 6,011,707 A | 1/2000 | Mine ........................... 363/89 |
| 6,057,723 A | 5/2000 | Yamaji et al. ............... 327/237 |
| 6,151,228 A * | 11/2000 | Miyazaki et al. ............. 363/48 |
| 2001/0048310 A1 | 12/2001 | Takahashi |

OTHER PUBLICATIONS

Patent Abstracts of Japan "Ratio Differential Relay Device" Appln. No. 52121125.

IBM Technical Disclosure Bulletin, "Improved Common Mode Choke" Jun. 1989, pp. 99–100.

Active EMI Filter for Switching Noise of High Frequency Inverters, Isao Takahashi, IEEE, Akihiro Ogata, IEEJ, Nagaoka University of Technology.

* cited by examiner

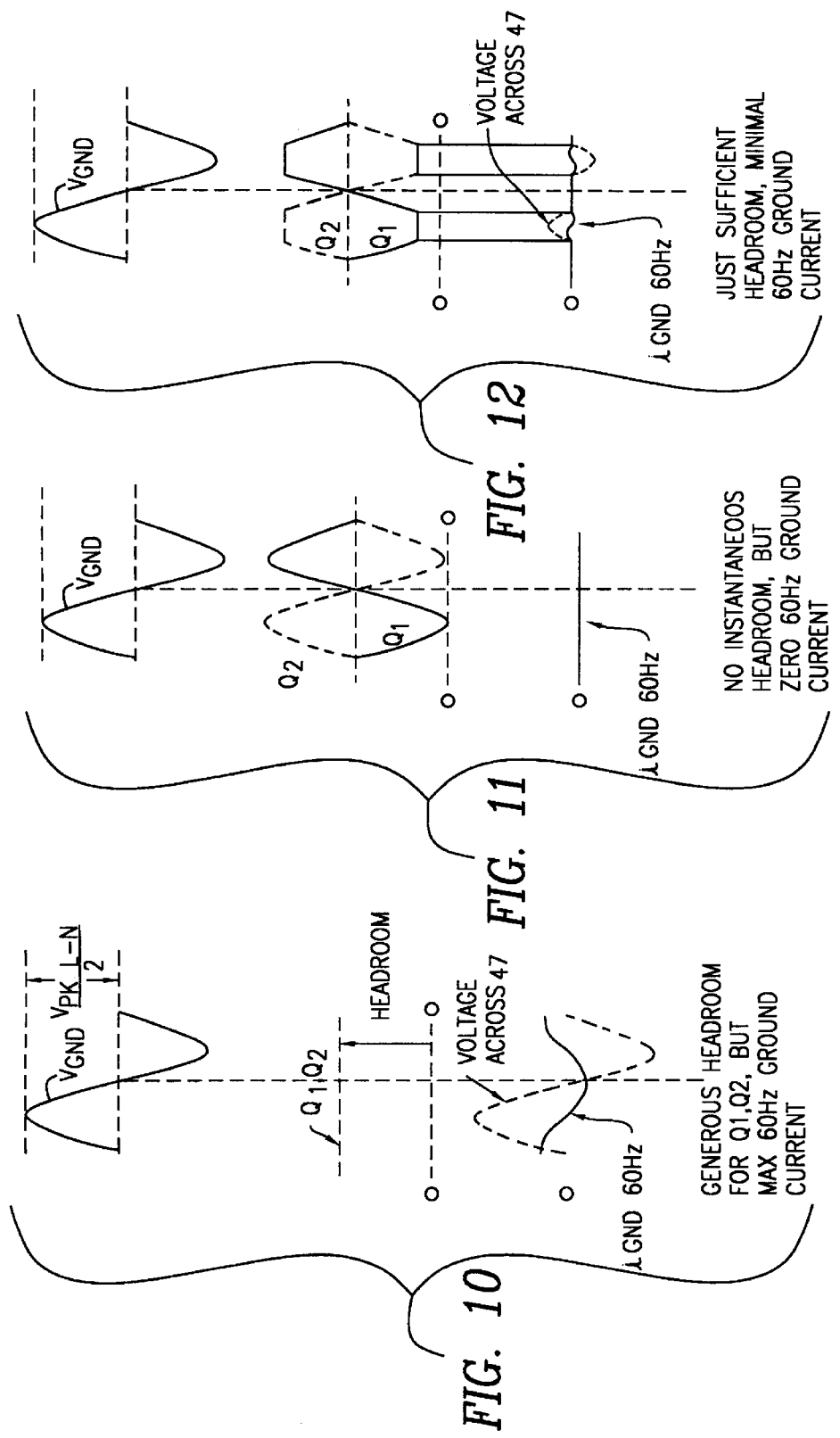

ACTIVE FILTER FOR REDUCTION OF COMMON MODE CURRENT

RELATED APPLICATIONS

This application is related to and claims priority to Provisional Application Serial Nos. 60/192,976, filed Mar. 28, 2000 and 60/211,999 filed Jun. 16, 2000.

FIELD OF THE INVENTION

This invention relates to filters for electrical circuits and more specifically relates to an active filter for reducing or redirecting the common mode current in switch mode power supplies and particularly for reducing the common mode current and EMI in a PWM motor drive circuit.

BACKGROUND OF THE INVENTION

High-speed switching devices such as bipolar transistors, MOSFETs and IGBT's enable increased carrier frequency for voltage-source PWM inverters, thus leading to much better operating characteristics. High-speed switching, however, causes the following serious problems, originating from a high rate-of-change in voltage and/or current:

a) ground current escaping to earth through stray capacitors inside motors and through long cables;

b) conducted and radiated EMI;

c) motor bearing current and shaft voltage; and d) shortening of insulation life of motors and transformers.

The voltage and/or current change caused by high-speed switching produces high-frequency oscillatory common-mode and normal-mode currents when the switching device(s) change state because parasitic stray capacitance inevitably exists inside a load, for example, an ac motor, as well as inside the switching converter. Thus, each time an inverter switching event occurs, the potential of the corresponding inverter output terminal moves rapidly with respect to ground, and a pulse of common mode current flows in the d-c link to the inverter, via the capacitance of the heatsink motor cable and motor windings to ground. The amplitude of this pulse of current for a class B (residential) motor drive is typically several hundred millamps to several amps; and the pulse width is typically 250 to 500 ns. For a class A drive (Industrial), and depending on the size of the motor and length of the motor cable, the pulse current amplitude is typically several amperes with a pulse width of 250 ns to 500 ns, to 20 amperes or more with a pulse width of 1 to 2 micro seconds.

The common mode oscillatory currents may have a frequency spectrum range from the switching frequency of the converter to several tens of MHZ, which creates a magnetic field and will produce radiated electromagnetic interference (EMI) throughout, thus adversely affecting electronic devices such as radio receivers, medical equipment, etc.

A number of Governmental restrictions apply to the degree of permissible line current EMI and permissible ground current in certain motor applications. Thus, in Class B residential (appliances), applications, ground current must be kept below from 1 to 20 mA over a frequency range from 0 to 30 kHz respectively (over a logarithmic curve); and conducted line current EMI must be kept below designated values (less than about 60 dB$\mu$V) over a frequency range of 150 kHz to 300 MHZ. For motor drive applications designated as class A Industrial applications, limitations on ground current are less stringent, but line current EMI is still limited over the 150 kHz to 30 MHZ range.

Generally, common-mode chokes and EMI filters, based on passive elements, may not completely solve these problems. Passive filters, consisting of a common mode inductor and "Y" capacitors in the input ac line have been used to filter the common mode current in such motor drive circuits. Passive common mode filters may place limits on the PWM frequency which can be used, are physically large (frequently a major fraction of the volume of the motor drive structure) and are expensive. Further, they are functionally imperfect in that they exhibit undesired resonance which runs counter to the desired filtering action. Further, in general purpose industrial drives, the drive circuit and motor are often connected by cables which are up to 100 meters or more long. The longer the cable, the greater the conducted common mode EMI in the motor cable, and the larger the required size of a conventional passive common mode input filter.

A common-mode transformer with an additional winding shorted by a resistor is known which can damp the oscillatory ground current. Unfortunately, a small amount of aperiodic ground current will still remain in this circuit.

Active filters for control of the common mode current in a pulse width modulated (PWM) controlled motor drive circuit are well known. Such devices are typically described in the paper an Active Circuit for Cancellation of Common-Mode Voltage Generated by a PWM Inverter, by Satoshi Ogasawara et al., IEES Transactions on Power Electronics, Vol. 13, No. 5, (September 1998 and in U.S. Pat. No. 5,831,842 in the names of Ogasawara et al.

FIG. 1 shows a typical prior art active filter circuit or EMI and noise canceller for an a-c motor. Thus, in FIG. 1, an a-c source comprising an input terminal L and a neutral terminal are connected to the a-c input terminals of a full wave bridge connected rectifier 40. While a single phase supply is shown, the principles in this and in all Figures to be described can be carried out with a three-phase or multi-phase input. The positive and negative busses of rectifier 40 contain points A and D respectively and are connected to a three-phase bridge connected PWM controlled inverter 41, at inverter terminals B and F. The output a-c terminals of the inverter are connected to a-c motor 42. A filter capacitor 40a is also connected across terminals B and F. Motor 42 has a grounded housing connected to ground wire 43 with ground terminal 43a.

The active filter consists of a pair of transistors $Q_1$ and $Q_2$, connected across the d-c output lines of rectifier 40 with their emitters connected at node E. These define amplifiers which are controlled by output winding 44 of a differential transformer having input windings 45 and 46 connected in the positive and negative output busses of rectifier 40. The winding polarities are designated by the conventional dot symbols. Winding 44 is connected between the control terminals of transistors $Q_1$ and $Q_2$ and the common emitter node E. A d-c isolating capacitor 47 is connected to ground line 43 at node C.

The active filter including capacitor 47 defines a path for diverting the majority of the common mode current which can otherwise flow in the path L or N, A, B, M (motor 42), 43, 43a and back to L or N; (or in the reverse path when polarity reverses) or in path L or N, D, F, M, 43, 43a (or in the reverse path when polarity reverses). Thus, most common mode current can be diverted, for currents from positive terminal A, in the path B, M, C, E, $Q_2$, F, B, for "positive current", and in the pattern B, M, C, E, $Q_1$, B for "negative" current. by the proper control of transistor $Q_1$ and $Q_2$. The path for common mode current flowing into negative terminal D follows the path F, M, C, E, $Q_2$, F for "positive"

current and F, M, C, E, $Q_1$, B for "negative" current. The degree of diversion depends on the current gain of winding 44 and the current gain of $Q_2$, for "positive current", and the current gain of winding 44 and current gain of $Q_1$, for "negative" current. In order to obtain a sufficient degree of diversion of the common mode current, the overall current gain of winding 44 and transistors $Q_1$ and $Q_2$ must be high.

The sensing transformer 44, 45, 46 of FIG. 1 has been large and expensive in order to provide sufficiently high current gain. It would be very desirable to reduce the size and cost of this transformer without jeopardizing the operation of the circuit. A further problem is that because of the high gain required, this closed-loop circuit has a tendency to produce unwanted oscillation.

Further, it has been found that the transistors $Q_1$ and $Q_2$ may not be able to operate in their linear regions over a large enough range within the "headroom" defined by the circuit, thus defeating the active filtering action. The headroom, or the voltage between the collector and emitter of transistors $Q_1$ and $Q_2$ is best understood by considering the approximate equivalent circuit of FIG. 1, as shown in FIG. 2, in which the ground potential at C is the same as that of the neutral line in FIG. 1. Transistors $Q_1$ and $Q_2$ are shown as resistors $R_1$ and $R_2$ respectively with respective parallel connected diodes. The d-c bridge 40 is shown as two d-c sources 50 and 51, each producing an output voltage of $V_{DC}/2$ where $V_{DC}$ is the full output voltage between the positive and negative busses at terminals A and D, and an a-c source 52 having a peak a-c voltage of $V_{DC}/2$.

It can be seen from FIG. 2 that headroom can disappear at different portions of the cycle of source 52. Thus, consider a first situation in which the leakage impedances of transistors $Q_1$ and Q2 are the same. In this case, the values of resistors $R_1$ and $R_2$ in FIG. 2 are about equal. Now, as the ground potential at terminal C swings between $(+)V_{DC}/2$ and $(-)V_{DC}/2$ with respect to the d-c midpoint at node 53 in FIG. 2, the potential at the emitters of transistors $Q_1$ and $Q_2$ also swings between $(+)V_{DC}/2$ and $(-)$ $V_{DC}12$, if it is assumed that the impedance of capacitor 47 is much smaller than $R_1$ and $R_2$. Therefore, during the periods when the potential at node E is close or equal to the potential of the d-c bus (at points B or F), insufficient voltage headroom exists for the relevant transistors $Q_1$ or $Q_2$ to operate as linear amplifiers, and the active filtering action is lost.

Consider next a condition in which the ground potential at C is the same as that of the neutral input line N in FIG. 1, and the leakage current of transistor $Q_2$ is now much higher than that of transistor $Q_1$, which, in FIG. 2 would be represented by the condition that $R_2$ is much less than $R_1$. This then biases the potential at E toward the negative d-c bus (at F). Therefore, the potential at E resides at the negative bus potential for a significant portion of each input cycle. During this period, transistor $Q_2$ cannot operate as a linear amplifier and the active filtering action is lost.

Consider next the condition where the ground is at N and the resistance of transistor $Q_1$ is much less than that of transistor $Q_2$; that is, $R_1$ is much less than $R_2$. This would bias point E toward the positive d-c bus (point B) so that, for a significant portion of each input cycle, transistor $Q_1$ cannot operate as a linear amplifier.

Lastly, consider a condition in which a small a-c potential (dotted line a-c source 52a in FIG. 2) exists between the ground wire 43 and neutral N of FIG. 1, as would occur if the grounded neutral of the supply transformer is electrically remote from the ground connection of the motor drive itself. In that case, the ground potential will swing between $+(dV+V_{DC}/2)$ and $-(dV+V_{DC}/2)$ where dV is the peak of the voltage wave shape of source 52a in FIG. 2. If the leakage characteristics of transistors $Q_1$ and $Q_2$ are about equal, the potential at E will attempt to swing by dV above the positive bus and by (–)dV below the negative d-c bus. During these periods, the voltage at E is clamped to the bus voltage by the low impedance reverse characteristics of transistors $Q_1$ and $Q_2$. Thus, no voltage headroom exists for the transistors to operate during these periods.

It would be very desirable to provide a circuit which provides sufficient headroom for transistors $Q_1$ and $Q_2$ under the above described conditions and for clamping the headroom voltages to a prescribed minimum level; or for regulating the average voltage at point E to the d-c midpoint potential.

The active filter of the prior art, as shown in FIG. 1, is always connected across the full d-c bus voltage. This requires a high enough voltage rating for the transistors $Q_1$ and $Q_2$ and causes a relatively high power dissipation in the active filter components. It would therefore be desirable to operate the active filter at a lower voltage, if possible, without degrading the performance of the active filter.

SUMMARY OF THE INVENTION

In accordance with a first feature of the invention, an operational amplifier is used as a buffer/amplifier between the current sensing transformer and the transistors $Q_1$ and $Q_2$. This permits a substantial reduction in the size of the common mode transformer, without affecting the operation of the circuit.

In accordance with a further feature of the invention, and to ensure sufficient headroom for the transistors $Q_1$ and $Q_2$ of FIG. 1, a pair of series connected balancing resistors are connected in parallel with respective ones of transistors $Q_1$ and $Q_2$. The novel resistors will have a value which ensures that sufficient voltage headroom is always maintained for transistor $Q_1$ and $Q_2$. This permits a current flow which is significantly higher than the maximum possible leakage current of transistors $Q_1$ and $Q_2$.

Alternatively, a further novel circuit which has substantially less power dissipation while still maintaining sufficient headroom for transistors $Q_1$ and $Q_2$ is provided, using active clamps for the voltage headroom of the transistors $Q_1$ and $Q_2$. In this circuit, the instantaneous voltage across each of transistors is sensed and compared to respective references. If the headroom voltage falls below the reference, a feedback error is fed back to the amplifier which drives the transistors $Q_1$ and $Q_2$ to maintain the required headroom. This novel circuit substantially reduces the power dissipation needed for voltage headroom maintenance and reduces the magnitude of ground current at line frequency through the d-c isolating capacitor 47.

In accordance with a still further feature of the invention, the headroom voltage control is carried out employing a reference voltage which is equal to one-half of the d-c bus voltage. The voltage at the emitter node E is then compared to this reference and the transistors $Q_1$ and $Q_2$ are controlled by an active regulation scheme which regulates the average voltage at E to the d-c midpoint voltage.

In the circuits described above, the amplifiers used need a source of operating or control or biasing voltage. A novel floating power supply is provided which derives its power from the d-c bus voltage and permits all output control voltages to move dynamically within the positive and negative bus voltage. This is accomplished by providing respective current source circuits connected to the positive and negative busses, respectively, and connected to one another through zener reference diodes. The nodes between the current sources and diodes and the node between the diodes form outputs for two control voltages and a common voltage reference which all swing dynamically with the bus voltage.

In a still further embodiment of the invention, the operating voltage across the active filter is sourced from a separate "filter bus" voltage which is lower than the full bus voltage. The active filter acts otherwise identically to a circuit driven from the full bus voltage. This novel circuit reduces the power dissipation in the active filter components and lowers the voltage rating of the transistors $Q_1$ and $Q_2$.

In accordance with a further important feature of the invention, selected active filter components are integrated into a single silicon chip, defining an active filter IC chip containing the principle active filter components and having suitable pin-outs for receiving the various input and bus connections.

A novel architecture is also provided, enabling the use of a very small toroidal current transformer as the common mode sensor. Unlike the architecture in FIG. 1, which requires a high gain, this novel architecture requires a gain of only unity, and thus avoids the above mentioned problem of unwanted oscillation. The architecture may also be implemented by MOSFET transistors instead of bipolars for improved linearization of the amplifier transfer characteristics wider bandwidth and improved ruggedness.

BRIEF DESCRIPTION OF THE DRAWINGS

FIGS. 10, 11 and 12 show the ground voltage, the voltage across transistors $Q_1$ and $Q_2$, the voltage across the filter capacitor and the ground current $i_{GND}$ at line frequency for three different headroom conditions.

DETAILED DESCRIPTION OF THE PREFERRED EMBODIMENTS

Figure 1:
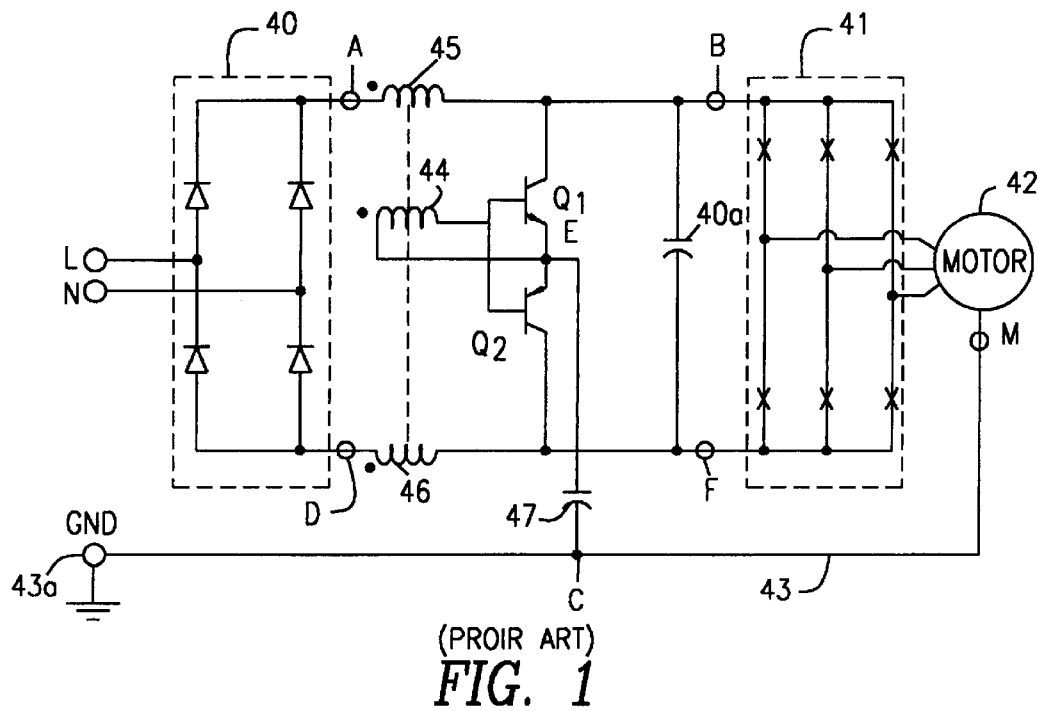
FIG. 1 is a circuit diagram of a prior art common mode active filter for a motor drive circuit.
Figure 3:
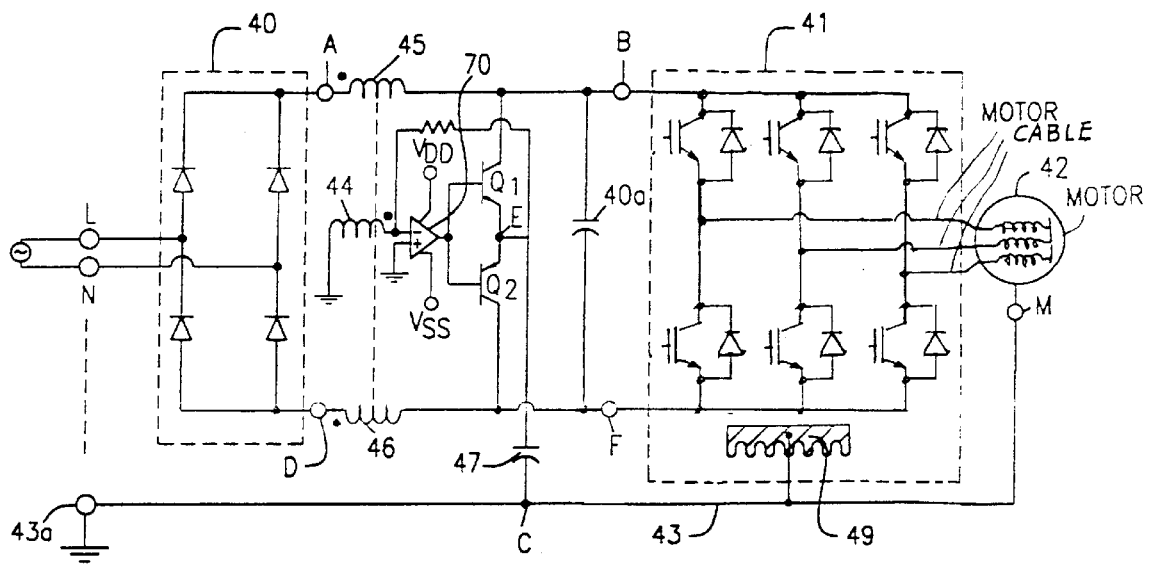
FIG. 3 is a circuit diagram of one improvement of the invention which employs a buffer amplifier between the current sensing transformer and the transistors.

FIG. 3 shows an improvement of the circuit of FIG. 1 wherein like numerals designate similar components as is true throughout this specification. FIG. 3 further shows, in schematic fashion, a heat sink 49 which receives the IGBTs (or MOSFETs) of the PWM inverter 41. Heat sink 49, like the housing of motor 42, is connected to ground line 43. In FIG. 3, however, a novel improvement is added which permits a substantial reduction in the size of the transformer 44, 45, 46 without affecting the operation of the active filter function. Thus, in FIG. 3, an operational amplifier 70 is added to the circuit to act as a buffer/amplifier between the secondary of the common mode current sensing transformer 44, 45, 46 and the transistors $Q_1$ and $Q_2$. This permits the size and cost of transformers 44, 45, 46 to be substantially reduced.

Figure 4:
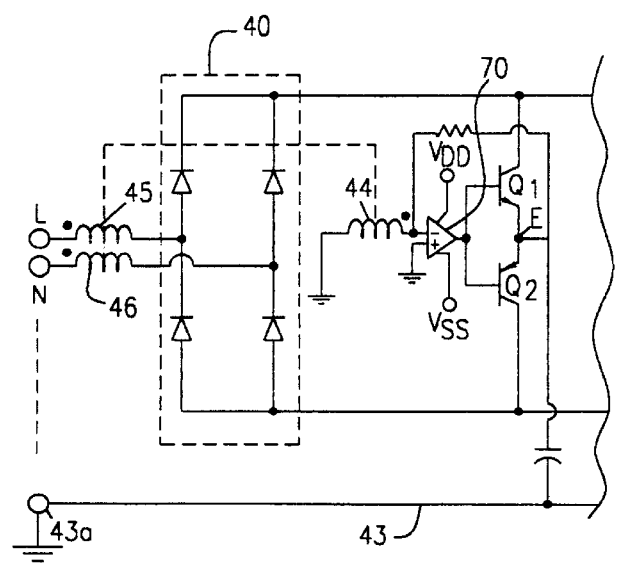
FIG. 4 shows modification of the circuit of FIG. 3 in which the current sense primary windings are placed in the a-c circuit.
Figure 5:
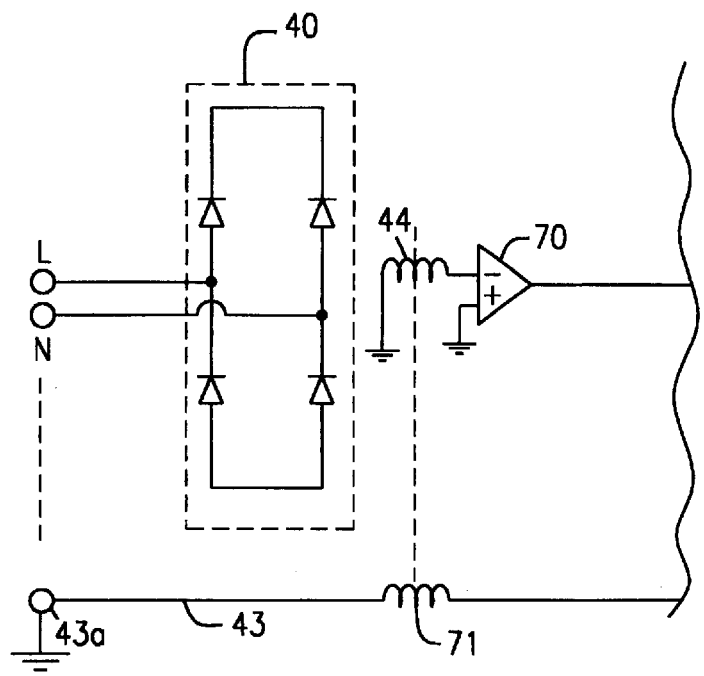
FIG. 5 is a circuit diagram of a further modification of the circuit of FIG. 3 in which the primary winding of the current transformer is in the ground wire.

While the primary windings 45 and 46 of the common mode transformer are shown in FIG. 3 at the output of rectifier 40, they may be placed in the a-c input lines as shown in FIG. 4; or, if desired, a single primary winding 71 can be connected in series with the ground terminal, as shown in FIG. 5. In all cases, the secondary winding 44 is simply coupled to one or more primary windings which carry or otherwise produce a signal related to the common mode current.

Regardless of the connection used, the novel circuits of FIGS. 3, 4 and 5 will divert the majority of the common mode current flow into the isolator capacitor 47 and transistors $Q_1$ and $Q_2$ and away from the external ground wire connected to 43a.

Figure 2:
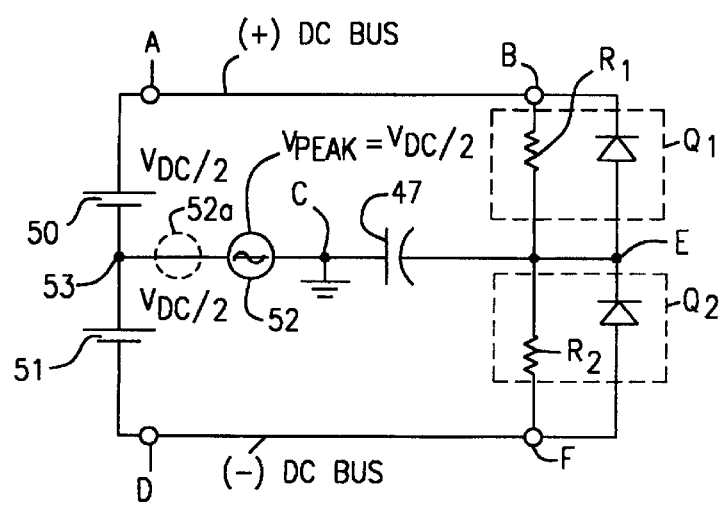
FIG. 2 is an equivalent circuit of the circuit of FIG. 1 to illustrate the issue of headroom voltage.
Figure 6:
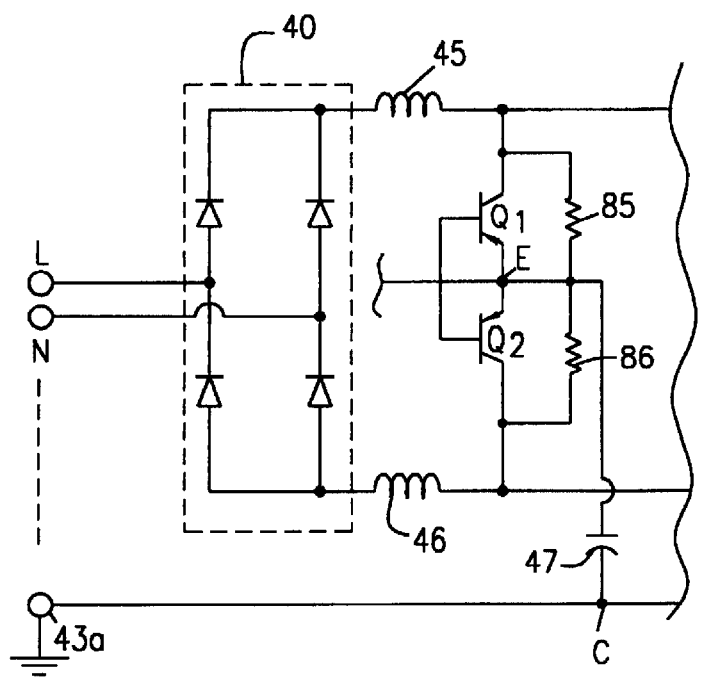
FIG. 6 (on the same sheet as FIG. 13) shows an improvement of the circuit of FIG. 3 which employs balancing resistors across the transistors to ensure sufficient headroom for their operation.

The circuits of FIGS. 1, 3, 4 and 5 will operate as desired provided transistors $Q_1$ and $Q_2$ always have sufficient voltage "headroom" to allow them to operate as linear amplifiers. However, as pointed out earlier with reference to FIG. 2, there are situations in which this headroom disappears during certain portions of the input voltage cycle. In accordance with another feature of the invention and as shown in FIG. 6 a novel circuit employing balancing resistors will ensure adequate headroom under these conditions. Thus, in FIG. 6, two resistors 85 and 86 are connected across transistors $Q_1$ and $Q_2$ respectively. Note that the full circuit is not shown in FIG. 6, it is being noted that such resistors are intended to be connected across the transistors $Q_1$ and $Q_2$ in FIGS. 1, 3, 4 and 5.

Resistors 85 and 86 must satisfy the following conditions:

1. Their values must be of the same order of magnitude as the reactance of capacitor 47 to ensure that the peak value of the a-c component of voltage at line frequency and developed across transistors $Q_1$ and $Q_2$ is substantially less than one-half the peak d-c bus voltage. For example, capacitor 47 may have a typical value of 0.01 $\mu$F and, at line frequency, the resistors 85 and 86 will be 265 kohms each.

2. Resistors 85 and 86 must be sized to carry significantly higher current than the maximum possible leakage current of transistors $Q_1$ and $Q_2$, in order to "swamp" differences in their leakage currents and ensure an approximately equal voltage balance across the transistors. In a specific example, in a circuit having a maximum d-c bus voltage of 400 volts with transistors $Q_1$ and $Q_2$ having a maximum leakage current of 0.5 mA each and capacitor 47 having a capacitance of 0.01 $\mu$F, the current through resistors 85 and 86 at half the bus voltage, i.e., 200 volts, should be about 2 mA. Thus, resistors 85 and 86 should be about 100 kohms. This is the value to be chosen since it is less than the 265 kohm value required by criteria 1 above.

The power dissipation in the 100 kohm resistors at the bus voltage of 400 volts is about 400 mw. A line frequency component of ground current of about 0.5 mA will be drawn through resistors 85 and 86 and the capacitor 47.

Figure 7:
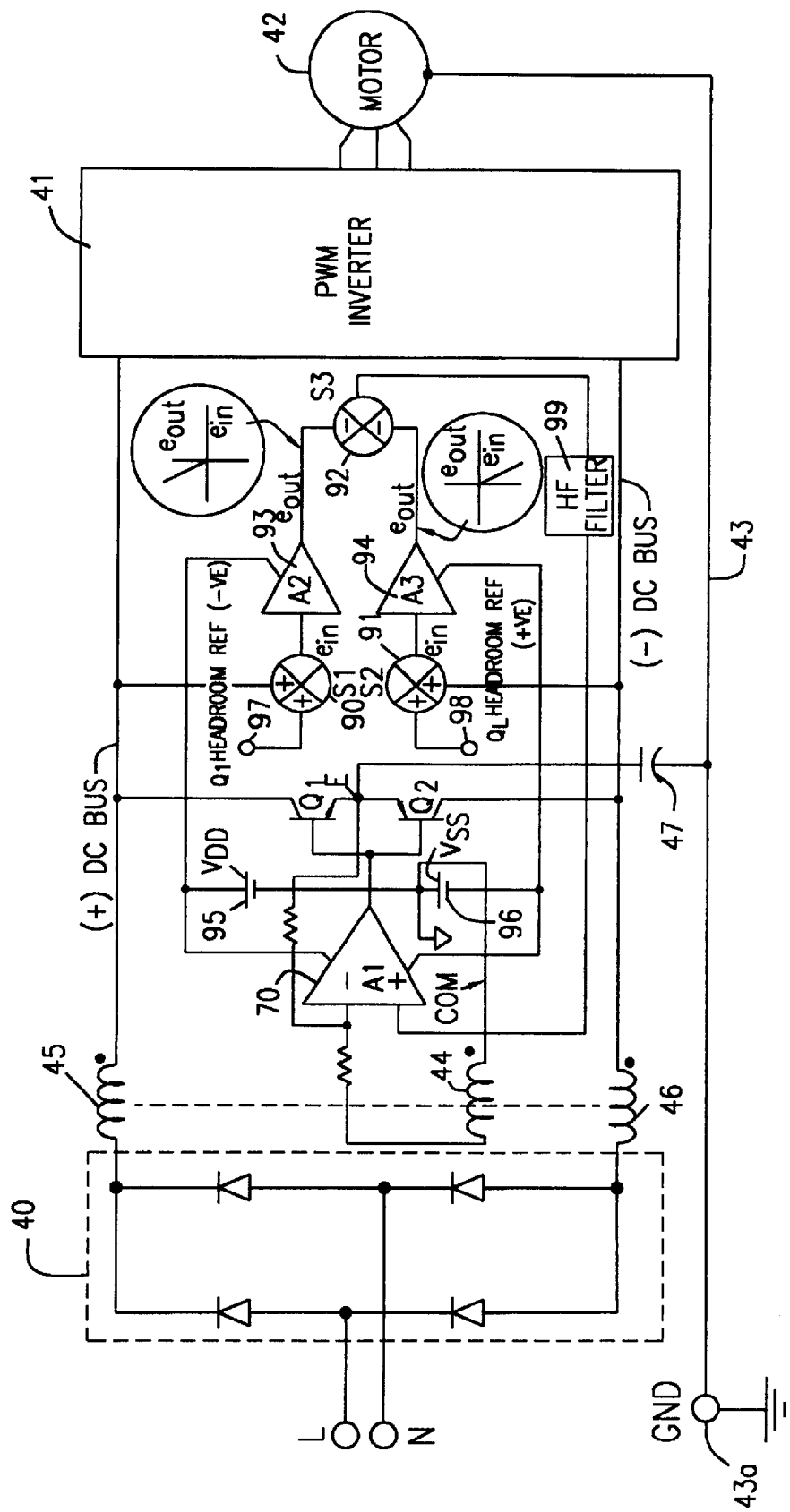
FIG. 7 shows a further embodiment of a circuit for insuring headroom using an active clamp circuit.

As will be later discussed, it would be desirable to integrate the control circuitry for the active filter into an integrated circuit. Thus, the power dissipation should be reduced as much as possible. FIG. 7 shows a circuit for the control of headroom which does not require resistors and which reduces power dissipation to about 20 mw. The circuit of FIG. 7 also reduces the line frequency ground current drawn through capacitor 47 from 0.5 mA to 0.2 mA.

The principle of operation of the circuit of FIG. 7 is to actively clamp the voltage headroom for transistors $Q_1$ and $Q_2$. This is done by sensing the instantaneous voltage across each of the transistors $Q_1$ and $Q_2$ and comparing it to a reference. If the headroom falls below the reference value, an error signal is produced and is fed back to amplifier 70 to drive the base of transistors $Q_1$ or $Q_2$ to maintain the desired headroom. Thus, transistors $Q_1$ and $Q_2$ will carry the common mode current and will also carry a small added component of current so as to maintain their necessary headroom. The power dissipation in each of transistors $Q_1$ and $Q_2$ is only about 20 mw at a bus voltage of 400 V, compared to 400 mV for each of resistors 85 and 86 in FIG. 6.

Referring now to FIG. 7, summing circuits 90, 91 and 92 and amplifiers 93 and 94 are added as shown. FIG. 7 also shows power supply d-c sources 95 and 96 for providing to $V_{DD}$ and $V_{SS}$ inputs respectively to operational amplifier 70. Each of summing circuits 90 and 91 have one input connected to (+)DC Bus and (−)DC Bus respectively, and another input (terminals 97 and 98 respectively) connected to reference voltages (−)$v_e$ and (+)$v_e$ respectively which are the headroom reference voltages for transistors $Q_1$ and $Q_2$ respectively. The summed voltages $e_{in}$ and $e^1_{in}$ respectively of devices of 90 and 91 are applied to operational amplifiers 93 and 94 respectively which have outputs $e_{out}$ and $e^1_{out}$ which are applied to inputs of summing circuit 92. The linear shapes of the characteristic outputs $e_{out}$ and $e^1_{out}$ are shown on the drawing in circled insets. The output of circuit 92 (an error signal output) is connected through high frequency filter 99 to the input of amplifier 70.

Thus, amplifier 70 will amplify the error signal; and amplifiers 93 and 94 respectively prevent the headroom voltages for transistors $Q_1$ and $Q_2$ from falling below their respective reference voltages.

In more detail, +DC BUS to $COM_{REF}(-v_e)$ is a negative reference voltage, which sets the required value of the +DC BUS to COM voltage. The value of this reference (−)$v_e$ is set to yield the desired headroom clamping level for transistor $Q_1$, based on the worst case assumption that the emitters of transistors $Q_1$ and $Q_2$ could instantaneously be positive with respect to COM by VDD. Thus +DC BUS to COM REF is set to represent the required minimum headroom for $Q_1$, plus VDD.

The difference between +DC BUS to COM REF (−ve) and the actual +DC BUS to COM voltage (+ve) is fed to the input of amplifier 93. The output of amplifier 93 is zero for positive input, and positive for negative input voltage. When the +DC BUS to COM voltage is greater than the absolute value of +DC BUS to COM REF, $e_{in}$ is positive, and the output of amplifier 93 is zero. When +DC BUS to COM attempts to become less than the absolute value of +DC BUS to COM REF which is set to represent the required minimum headroom for $Q_1$, plus VDD, $e_{in}$ becomes negative, and the output $e_{out}$ of amplifier 93 becomes positive. This output is inverted at the summing junction 92, then passed through the HF filter 99 to the amplifier 70, biasing the output of this amplifier negatively. The result is that transistor $Q_2$ is biased on just sufficiently that the voltage headroom across transistor $Q_1$ is regulated to the set value.

The (−)DC BUS to COM REF is a set positive reference voltage at terminal 98. The required value of this reference represents the required minimum headroom for transistor $Q_2$, plus the absolute value of VSS.

The difference between (−)DC BUS to COM REF (+ve) and the −DC BUS to COM voltage (−ve) is fed to the input of amplifier 94. The output of amplifier 94 is zero for negative input, and negative for positive input voltage. When the absolute value of the (−)DC BUS to COM voltage is greater than (−)DC BUS to COM REF, $e^1_{in}$ is negative, and the output of A3 is zero. When the absolute value of the (−)DC BUS to COM voltage attempts to become less than (−)DC BUS to COM REF, $e^1_{in}$ becomes positive, and the output $e^1_{out}$ of amplifier 94 becomes negative. This output is inverted at the summing junction 92, then passed through the HF filter 99 to the input of amplifier 70, biasing the output of this amplifier positively. The result is that transistor $Q_1$ is biased on just sufficiently that the voltage headroom across transistor $Q_2$ is regulated to the set value.

The HF filter 99 removes high frequency components from the error signal, caused by the common mode current of the inverter/motor that flows through $C_{FILT}$ 47. Thus the closed loop regulator corrects against errors of potential at E that would otherwise occur at line frequency, but essentially does not attempt to make corrections for faster instantaneous deviations due to the switching events of the inverter.

Figure 8:
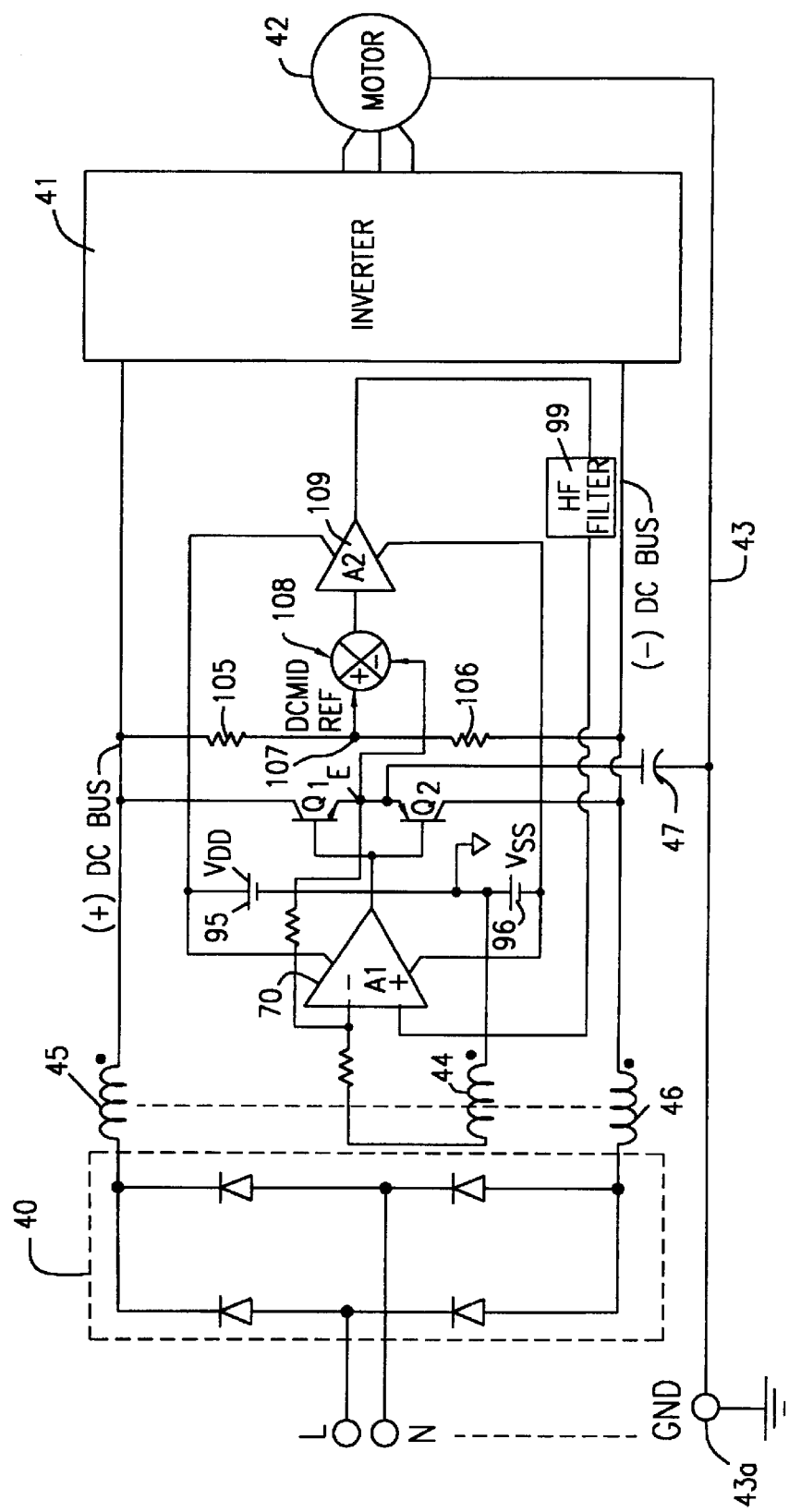
FIG. 8 is a still further embodiment of a headroom control circuit, in which the midpoint d-c bus potential is actively regulated.

FIG. 8 shows a further alternative to the circuit of FIG. 6 in which the voltage at node E of the common emitters of transistors $Q_1$ and $Q_2$ is sensed and the average value of this voltage is regulated to the d-c midpoint voltage. Thus, in FIG. 8, a reference voltage circuit defining the d-c midvoltage consists of resistors 105 and 106 which are low power resistors which are of equal value and produce voltage at node 107 which is the midpoint of the d-c voltage between the (+)DC Bus and (−)DC Bus voltages. This d-c midpoint reference voltage, and the potential at node E are applied to, and compared by, a summing comparator 108. The difference output is then applied to amplifier 109 and its output error signal is connected via HF filter 99 as an input to amplifier 70.

In operation, if the voltage at E attempts to rise above the d-c midpoint reference potential at node 107, amplifier 109 delivers a negative bias signal to the input of amplifier 70. The output of amplifier 70 also assumes negative bias, turning on transistor $Q_2$ to the extent necessary to correct the voltage at emitter node E and back towards the d-c midpoint reference potential.

Conversely, if the voltage at E attempts to fall below the d-c midpoint potential, the output of amplifier 70 assumes a positive bias, turning on transistor $Q_1$ to the extent necessary to correct the voltage at E back towards the d-c midpoint potential. The HF filter 99 again removes high frequency components from the error signal.

Thus the regulator loop corrects against variations of potential at E that would otherwise occur at line frequency, but essentially does not attempt to make corrections for faster instantaneous deviations caused by the switching events of the inverter.

With the scheme of FIG. 8, the average voltage headroom for transistors $Q_1$ and $Q_2$ is maintained at approximately half the bus voltage. While this is more than sufficient headroom, a disadvantage, relative to the "headroom clamping" approach of FIG. 7, is that the line frequency component of voltage across capacitor 47 is increased and the corresponding line frequency component of ground current that flows through capacitor 47 is relatively high.

Figure 9:
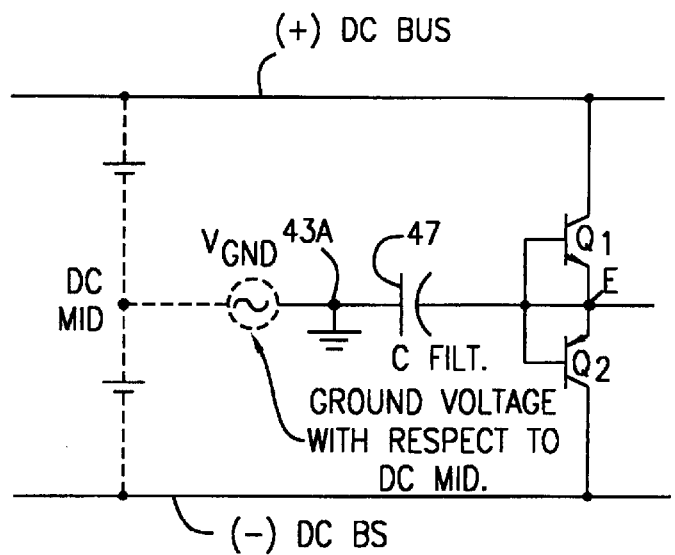
FIG. 9 is an equivalent circuit of the circuit of FIG. 8.

FIGS. 9 to 12 illustrate the design trade-offs between headroom voltage for transistors $Q_1$ and $Q_2$ and ground current for the circuits of FIGS. 1, 7 and 8 (at 60 Hz). FIG. 9 is an equivalent circuit of a portion of the circuit of FIG. 8. The a-c voltage source shown in dotted lines between nodes 107 and 43a is the a-c ground voltage with respect to the DC midpoint reference voltage. This voltage, as shown in FIG. 10 is one-half of the peak a-c voltage between a-c lines L and N (assuming a single phase input with N at ground potential) and this voltage drives ground current through capacitor 47.

When the circuit is designed to provide generous headroom for transistors $Q_1$ and $Q_2$ as shown in FIG. 10, as by regulating the voltage at E to the d-c midpoint potential, the ground current $i_{GND}$ at 60 Hz increases as shown in the bottom graph of FIG. 10.

If, however, the voltage at E is allowed to swing freely with respect to the bus potentials, as shown in FIG. 11, the line frequency voltage across capacitor 47 is zero and the corresponding line frequency ground current is also zero. The headroom voltage, however, (the center graph of FIG. 11), is insufficient for the desired filtering of the common mode motor current (as in FIG. 1).

Finally, if, as in FIG. 7, a headroom clamping circuit is employed, allowing the potential at node E to swing freely until the headroom falls below a set value, the curves appear as in FIG. 12 where headroom for the transistors is clamped to the set value while the 60 Hz ground current is reduced to a small value during the clamp intervals only.

An isolated floating power supply would normally be provided for the needed Vdd and Vss supply voltages for the amplifier circuits of FIGS. 3, 4, 5, 7 and 8. An obvious way of deriving the required power supply voltages would be via a separate isolated winding on the power supply transformer that serves the control electronics and gate drive circuits.

Figure 13:
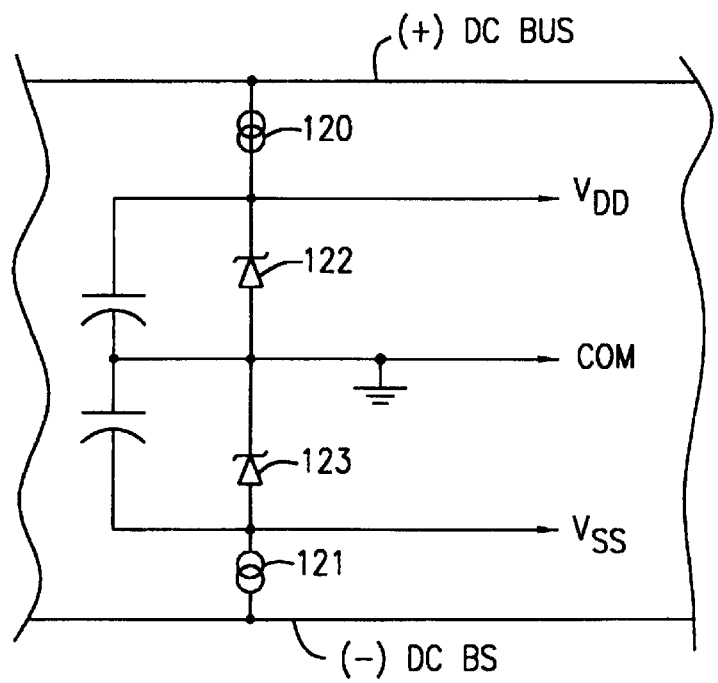
FIG. 13 (on the same sheet as FIG. 6) shows a novel power supply for the amplifier circuits of the prior figures which derives its power from the d-c bus.

FIG. 13, however, shows an alternative method for deriving the required power supply voltages. Thus, in FIG. 13, current sources 120 and 121 feed a fixed current from the d-c bus, to create the Vdd and Vss power supply voltages across the regulator zener diodes 122 and 123 respectively. The currents of sources 120 and 121 must be equal, and independent of the voltage at COM. The voltage then moves dynamically within the positive and negative bus voltages, and the headroom is controlled as described above.

Note that the current sources 120 and 121 cannot be replaced by simple dropping resistors, because the currents of sources 120 and 121 could not then be instantaneously equal, because the two resistors would have different voltages impressed across them as the potential at COM dynamically changes. The difference between such two resistor currents would be forced through capacitor 47, interfering with the active filter function.

The use of the described bus-derived power supply circuit may be limited by the power dissipation associated with the circuit. This depends upon the required power supply current, and the bus voltage. For example, if the maximum required power supply current is 3 mA, and the bus voltage is 200V, the maximum total dissipation due to the power supply would be 600 mW, which is acceptable.

Figure 14:
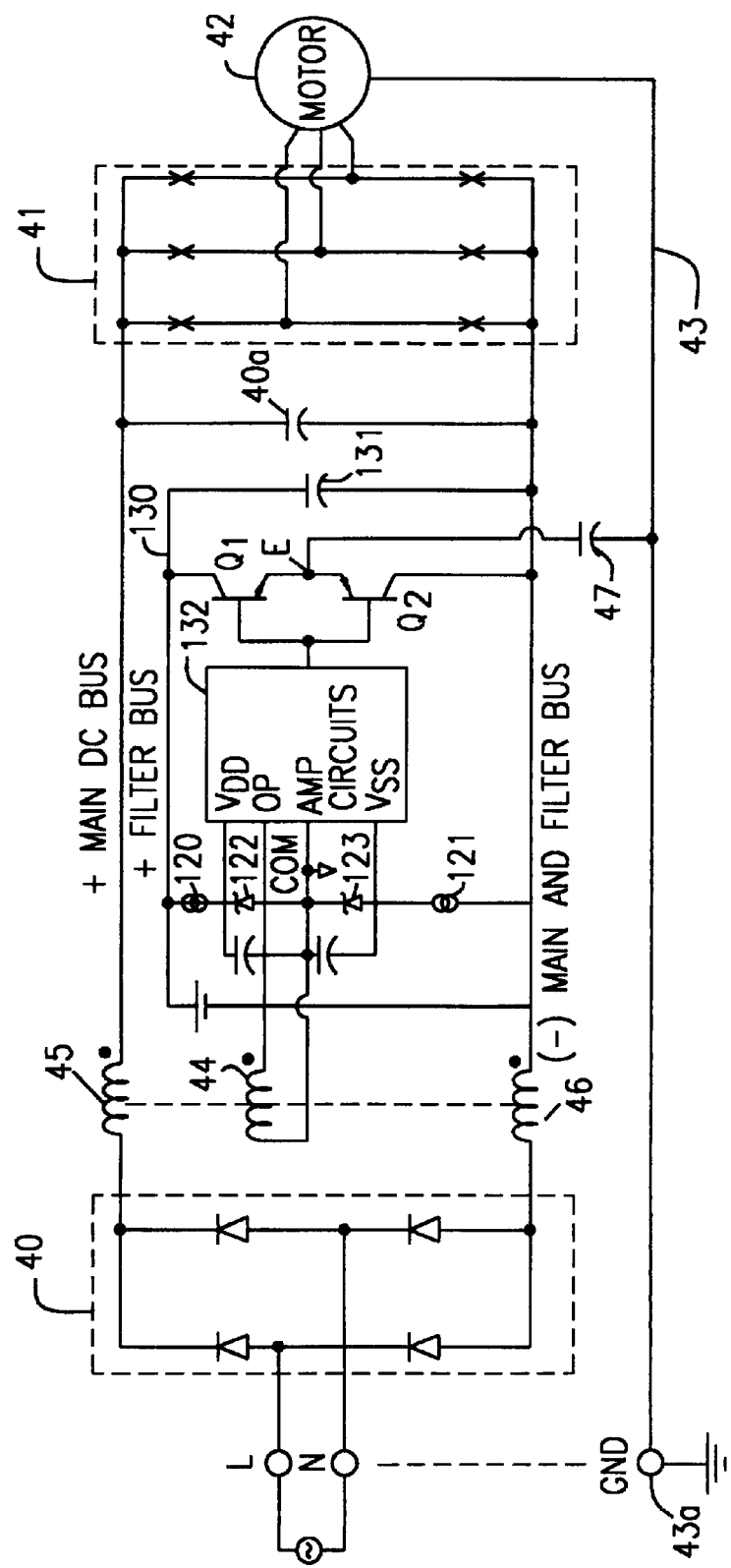
FIG. 14 is a circuit diagram of an improvement of the prior described circuits in which the filter bus voltage is less than the main d-c bus voltage.

FIG. 14 is a circuit diagram of a novel active filter which has a reduced operating voltage. Thus, it has been recognized that it is not necessary for the active filter to be connected directly across the full d-c bus voltage. The active filter, complete with the previously described current source power supply, can be sourced from a separate "filter bus" voltage, that can be lower than the full d-c bus voltage. The headroom control methods already described will still operate in the same way to maintain the desired headroom for transistors $Q_1$ and $Q_2$. It is necessary only that a low ac impedance path for the common mode current is provided from the collectors of both transistors $Q_1$ and $Q_2$ to one of the main d-c busses. A low ac impedance path to the other main bus is then already in-place, via the main d-c bus capacitor 40a.

FIG. 14 shows the arrangement with a separate positive filter bus 130 which provides the positive voltage for the active circuit; the negative bus of the active filter being common with the main negative d-c bus. (It is also possible to provide a separate negative filter bus voltage, with the positive bus of the active filter being common with the main positive d-c bus). The operational amplifier circuits are schematically shown as block 132.

The capacitor 131 provides the required low ac impedance between the positive filter bus 130 and the main negative bus. Flow paths for the common mode current under various operating conditions are the same as those previously described.

The advantages of using a filter bus voltage that is lower than the main d-c bus voltage are:

(a) a lower power dissipation in the active filter components, including the current source power supply.

(b) a lower voltage rating is required for the transistors $Q_1$ and $Q_2$, and for the current source transistors of the power supply. A lower voltage rating for transistors $Q_1$ and $Q_2$ is advantageous because this permits transistors with better Safe Operating Area and better high frequency performance, giving faster response and improved performance of the active filter.

The use of a filter bus voltage that is lower than the main d-c bus voltage will reduce the allowed swing of line-frequency voltage across transistors $Q_1$ and $Q_2$, because their emitters E must now swing within narrower limits. Thus, in order to maintain the required operating headroom for transistors $Q_1$ and $Q_2$, the line-frequency voltage swing across filter capacitor 47 may be forced to increase, resulting in an increase in the line-frequency component of ground current drawn through capacitor 47. While this would be the case with single phase input with grounded neutral; it would not be the case for three phase input with grounded neutral, or for 1-phase input with midpoint ground. Thus, with a three phase input with neutral ground, the swing of ground voltage with respect to the d-c midpoint is less than 25% of the main d-c bus voltage. The filter bus voltage would therefore have to be reduced to less than about 25% of the main bus voltage before the line-frequency component of current drawn through capacitor 47 would increase.

Figure 15:
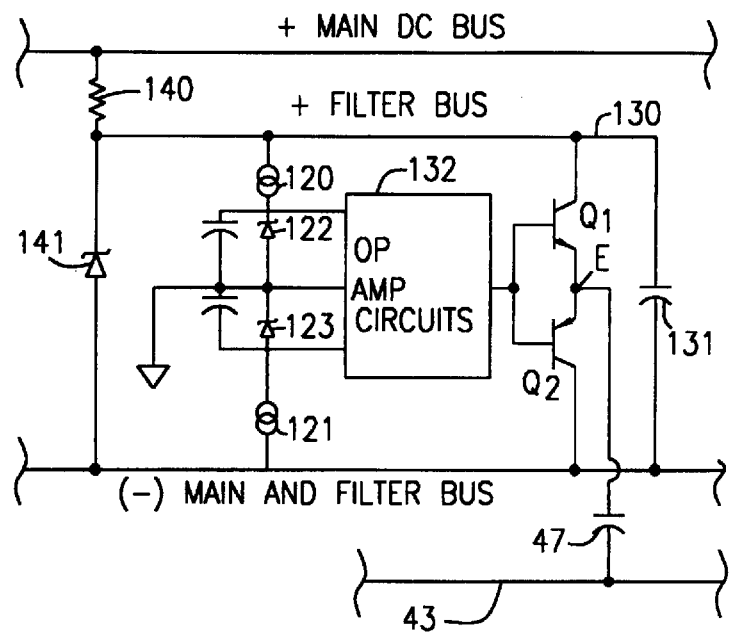
FIG. 15 is an alternative to the circuit of FIG. 14 in which the reduced filter bus voltage is derived from a dropping resistor and zener diode circuit.

FIGS. 15 to 18 show alternate circuits for deriving a lower filter bus voltage from the main d-c bus voltage. In FIG. 15, the filter bus voltage is derived via a dropping resistor 140 and a voltage regulator diode 141 from the d-c bus. While the resistor 140 dissipates power, it permits power savings in the active filter itself, and may allow improved filter performance, by virtue of using lower voltage and wider bandwidth active components.

Figure 16:
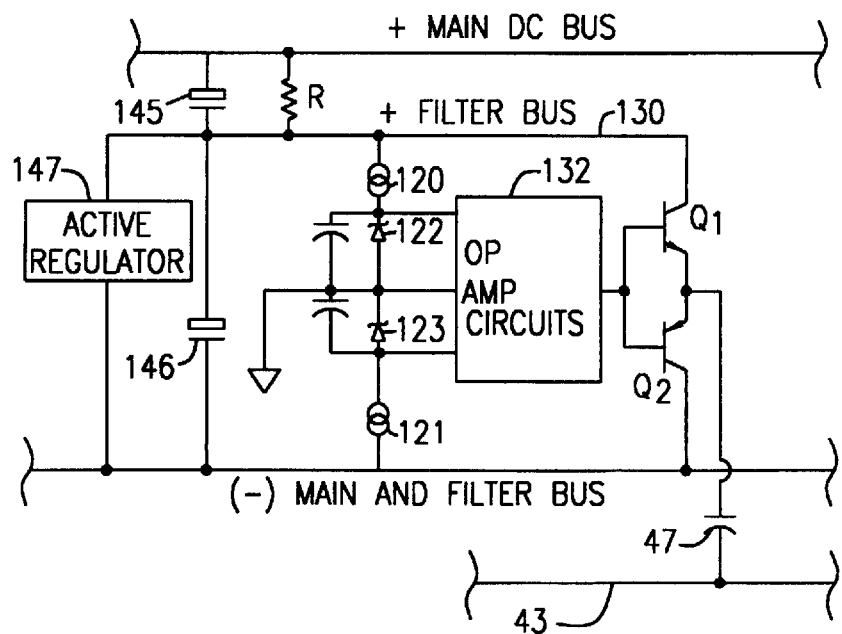
FIG. 16 is another circuit for deriving a reduced filter voltage using series bus capacitors.

FIG. 16 employs two series connected d-c bus capacitors 145 and 146, each supporting approximately half the bus voltage. Series connected bus capacitors may be used where the input voltage is 380V or higher. The principle in FIG. 16 is to use the voltage across the lower bus capacitor 146, i.e., approximately half the d-c bus voltage, as the filter bus voltage. This requires additional active means shown as active regulator block 147 for keeping the voltages across the two bus capacitors balanced.

Figure 17:
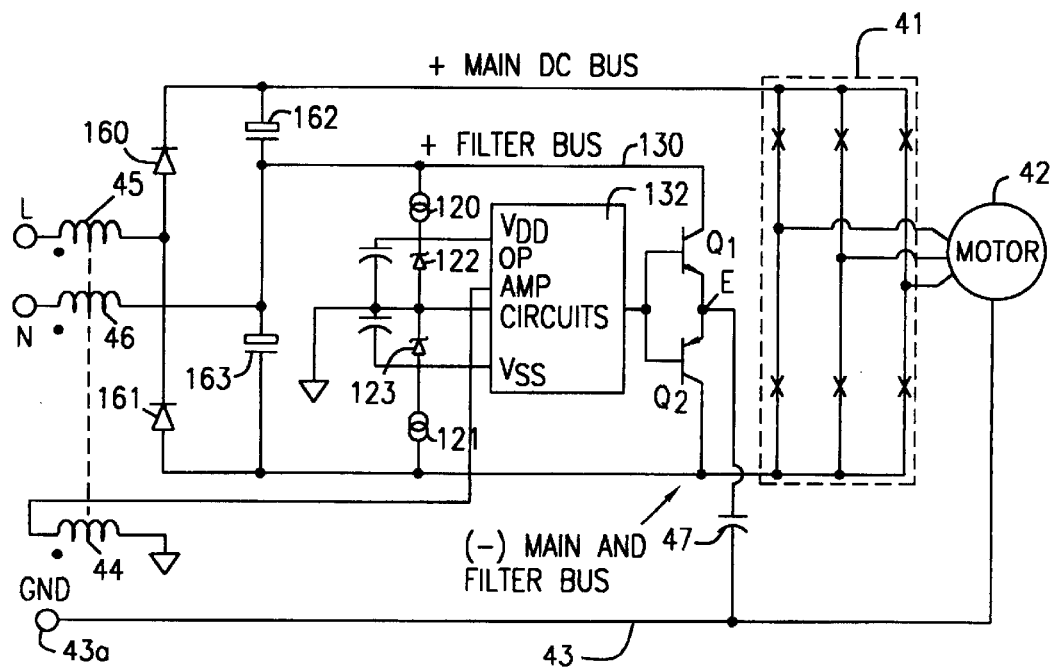
FIG. 17 is a circuit for deriving a reduced filter voltage of one-half of the full bus voltage and employing a voltage doubler.

FIG. 17 shows an arrangement with a single phase supply L, N input to a voltage doubler circuit. The voltage doubler replaces rectifier 40 of the preceding circuits and consists of diodes 160, 161 and capacitors 162 and 163. The main d-c bus voltage is approximately twice the peak line voltage. The voltage across each capacitor is half the full d-c bus voltage. The filter bus 130 is connected to the lower bus capacitor 161 in accordance with the feature of the invention, and is half the full d-c bus voltage. No additional means of balancing the voltages across the doubler capacitors is needed, since balancing of these voltages is a natural result of the operation of the voltage doubler circuit.

Figure 18:
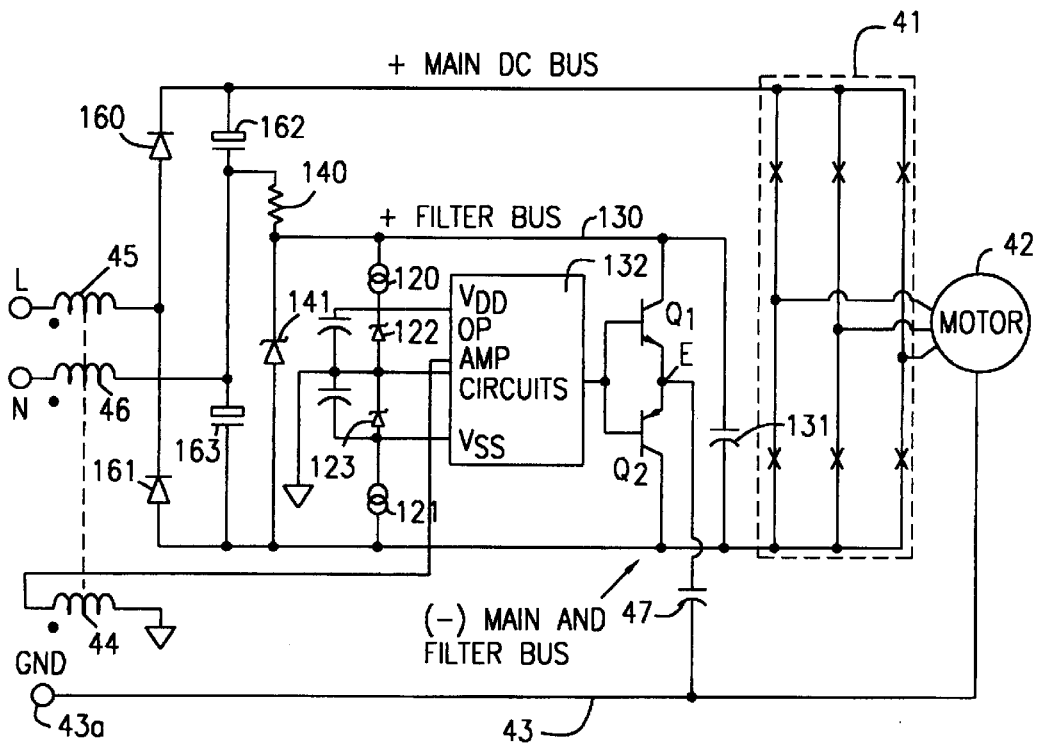
FIG. 18 is a circuit similar to that of FIG. 17 in which the filter voltage is less than one-half of the full d-c bus voltage.

FIG. 18 is similar to FIG. 17, but adds the resistor 140 and zener diode 141 as in FIG. 15 to derive a lower filter bus voltage, which is less than one-half of the main d-c bus voltage.

Figure 19:
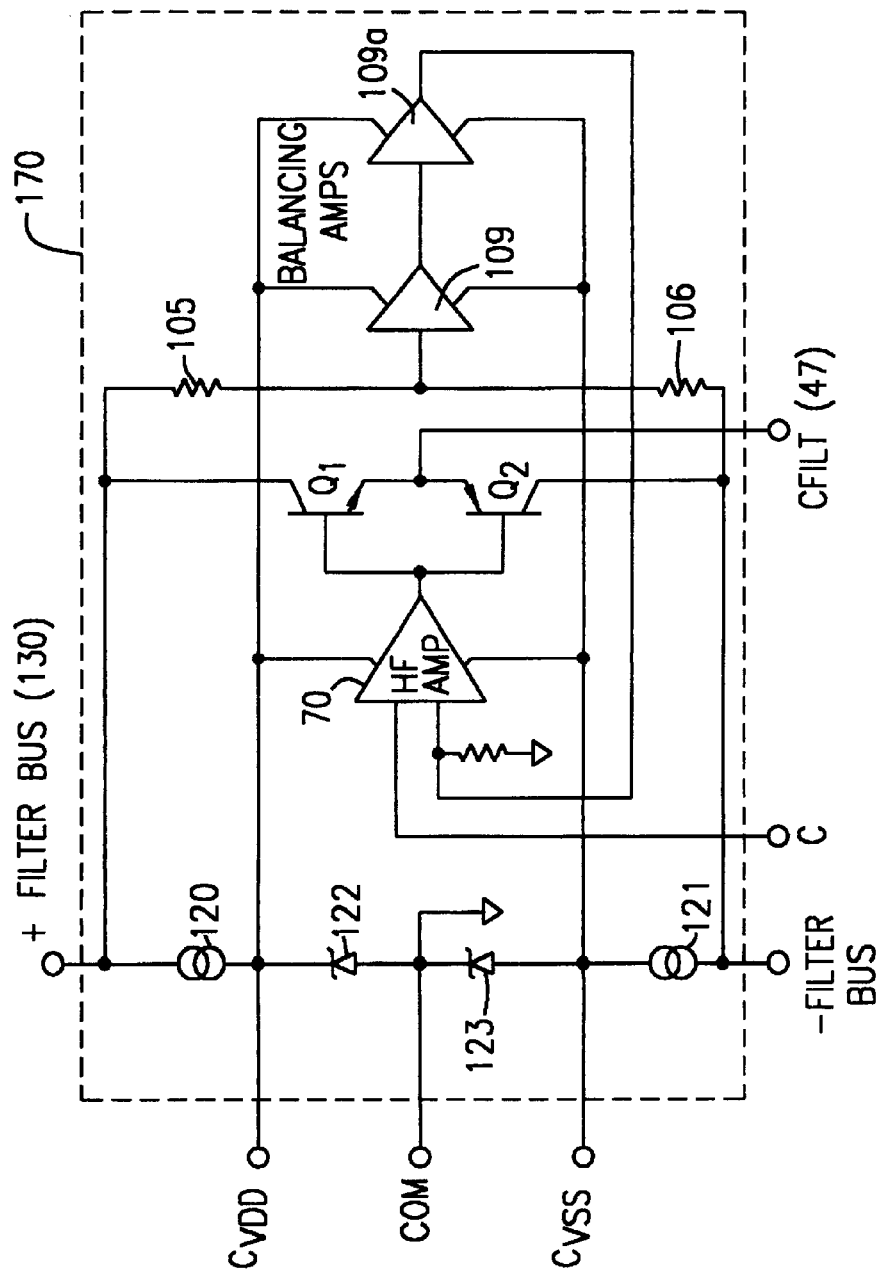
FIG. 19 is a diagram of an integrated circuit chip into which selected ones of the filter components of the preceding figures are integrated into a single chip of silicon.

There is next described in FIG. 19 an arrangement for integrating the prior described circuits into an integrated circuit active filter chip product.

The integrated circuit of FIG. 19 may have numerous filter components integrated into a single silicon chip, as shown by the dotted line periphery 170. The integrated circuit 171 contains transistors $Q_1$ and $Q_2$; the voltage divider 105, 106 of FIG. 8; the floating power supply 120–123 of FIG. 13; the amplifiers 70 and 109 of FIG. 8 (and a second amplifier 109a). The IC chip 170 then has plural pin-outs including the labeled pins for (+)Filter Bus; (−)Filter Bus; capacitor 47; CT winding 44; and capacitor $CV_{DD}$, and $C_{VSS}$. Added pins may be provided for decoupling capacitors and the like.

Figure 20:
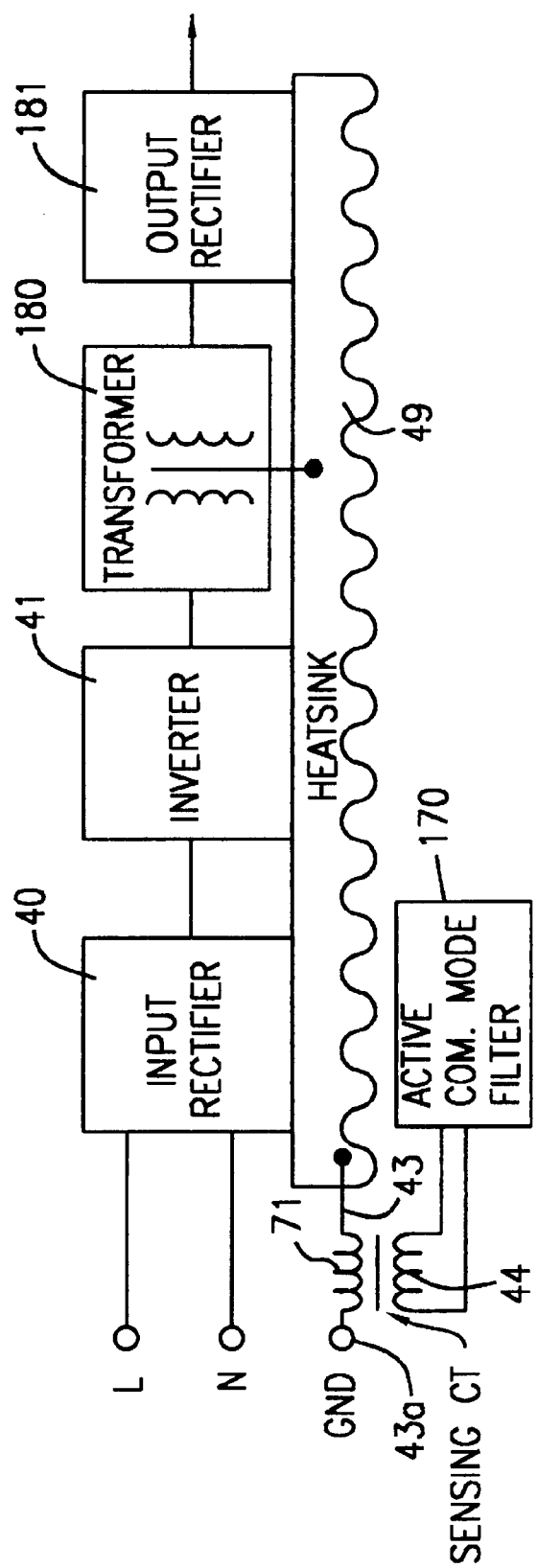
FIG. 20 shows the architecture of a circuit having an active filter IC chip in a switching power supply.

FIG. 20 shows how the integrated circuit 170 has a general application as an active filter in a switching power supply. Thus, the switching power supply may have an input rectifier 40 connected to a-c input lines L and N, and an inverter 41. The output of inverters 41 is connected to a transformer 180 which is then connected to an output rectifier 181. All of parts 40, 41, and 181 are mounted on heat sink 49. The heat sink is connected to a ground line which contains the primary of a sensing current transformer housing a secondary winding 44, as in FIG. 5.

The active common mode filter integrated circuit 170 is then connected to the secondary sense winding 44 and controls the common mode current as previously described.

The use of the current sensor 71, 44 in FIG. 20 is employed rather than the differential CT 44, 45, 46 because such a circuit is more universally applicable and advantageous for power supplies and because there is no external motor which could have an extraneous ground current which would not be picked up by the current transformer.

In the case of a power supply, all the grounded parts are contained within the power supply itself (the output transformer 180 can have a ground screen), and, therefore, there may be no stray external ground current.

In the ground connection shown in FIGS. 5 and 20, the CT 71, 44 will be smaller because it has only one primary winding, sized for the ground current, (the ground wire actually must be same size as the "live" wires) versus two primaries, each sized for the full load current. Also, since the ground current is sensed directly, there is no possibility for differential errors.

Figure 21:
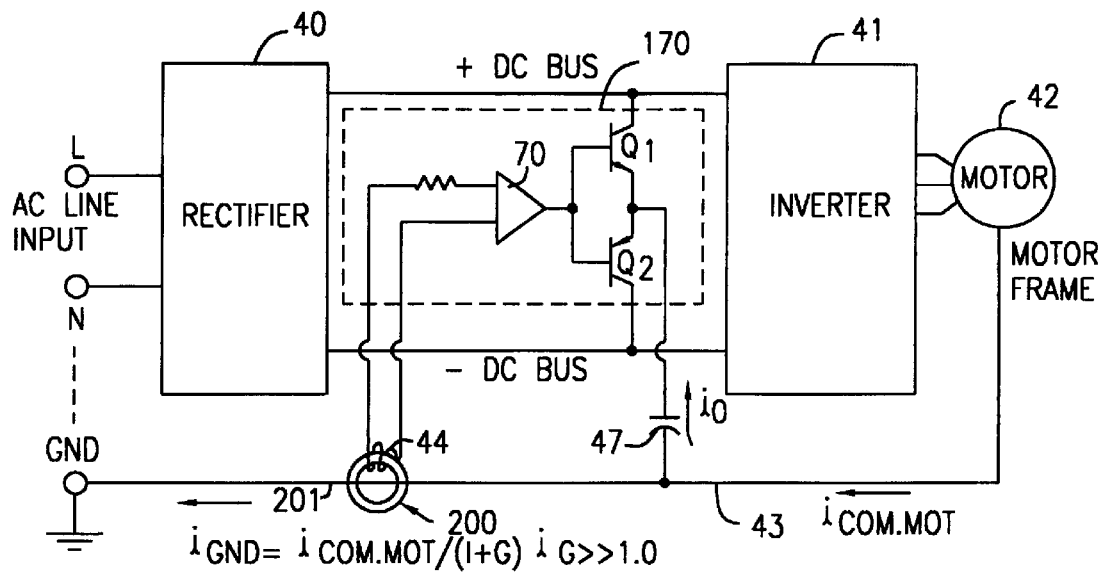
FIG. 21 shows a feedback based architecture using an active filter IC chip in a motor drive circuit with the current sensor primary in the ground wire.

One basic system architecture for the active common mode filter of the invention is shown in FIG. 21 showing a toroidal current sensing transformer 200. A basic design objective is that the toroidal current sensing transformer 200 should be as small as possible. Preferably the primary should be just a single wire 201 that passes directly through the center of the toroidal core, as illustrated in FIG. 21.

The architecture of FIG. 21 is a closed loop feedback based system. It is a feedback system in that the signal on the primary of the sensor 200 is an attenuated signal, so the amplifier consisting of winding 44, buffer 70 and transistors $Q_1$ and $Q_2$ must be a high gain amplifier. Consequently, the system is subject to possible oscillation and requires a moderately large CT. That is, the architecture in FIG. 21 basically requires a high current gain, G, between the output current of the amplifier, i0, and the current input, 'GND' to the primary 201 of the current transformer. The reasons for this are:

$$a) \frac{i_{GND}}{i_{COM\ MOT}} = \frac{1}{1+G}$$

$$\text{where } G = \frac{i_o}{i_{GND}}$$

Therefore, in order to minimize iGND, G must have a high value.

b) the propagation delay times of the bipolar transistors, $Q_1$ and $Q_2$, result in a lag between the output current $i_o$, and the input current, $i_{GND}$, of the CT 200. This lag causes spikes on the ground current waveform at the crossover points. This effect becomes more pronounced as the half-period of the oscillatory current, $i_{COM\ MOT}$, decreases. A typical half-period of $i_{COM\ MOT}$ is 200 to 250 nanoseconds, and the crossover spikes are significant.

The crossover spikes can be reduced by increasing the gain. The higher the gain, the more overdrive current is fed to the bases of transistors $Q_1$ and $Q_2$ during the crossover periods, which reduces the lag. The gain can be increased by increasing the number of primary turns of the current transformer. Unfortunately, this is not desirable because it is contrary to the basic design objective of minimizing the size of the current transformer and using a primary wire that passes just once through the center of the CT.

In principle, the gain could be increased by increasing the gain of the operational amplifier circuit 70. In practice, this tends to cause closed-loop oscillation, which has been found to be difficult to suppress.

Figure 22:
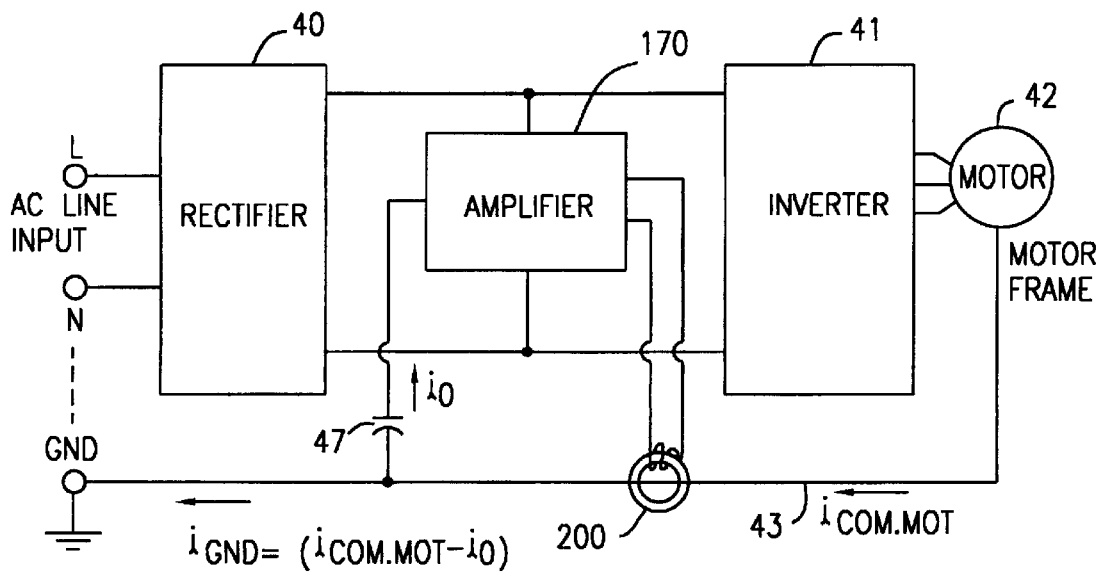
FIG. 22 shows a modification of the architecture of FIG. 21 employing a feed forward system which permits improved operation.

An improved architecture is shown in FIG. 22. The architecture of FIG. 22 is a feed forward architecture in which the full forward current $i_{com\ mot}$ flows through the primary winding of CT 200 and the full current is always sensed even as the ground current is being reduced. Consequently, the amplifier needs a gain equal to 1.0. This system, with unity gain, has good stability, and a small CT size. Thus, in contrast to the architecture in FIG. 21, this architecture requires unity current gain, G, between the current $i_{com\ mot}$ at the input of the current transformer, and the output current, 10, of the amplifier. The ground current, iGND, is:

$$i_{GND} = i_{COM\ MOT} - i_0 i_{COM\ MOT} - G \cdot i_{COM\ MOT}$$

For perfect cancellation of the ground current, the gain G must therefore be exactly 1.0.

The fundamental advantages of the architecture of FIG. 22 are:

a) Because the required current gain, G, is only unity, the current transformer 200 can be physically much smaller, with just a single primary wire passing through the center of the toroidal core.

b) The circuitry has reduced susceptibility to instability, because the overall current gain, from input of the current transformer 200 to the output of the amplifier 170, is only 1.0.

c) A further advantage of the basic architecture of FIG. 22 over that of FIG. 21 arises where differential primary windings must be used on the current transformer 200, rather than a single ground current sensing primary.

Figure 23:
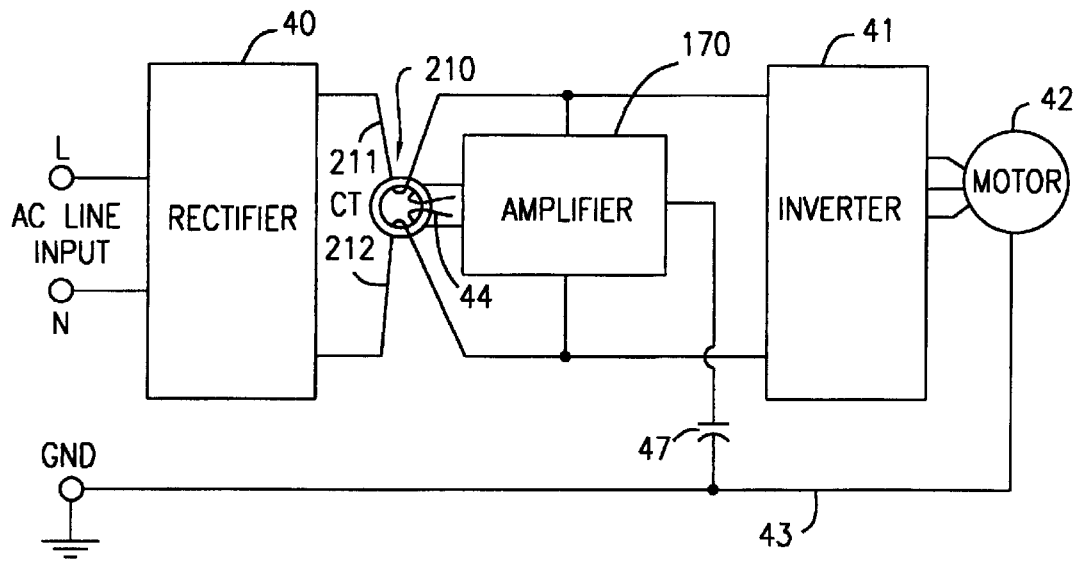
FIG. 23 shows an architecture like that of FIG. 21, but using a differential current transformer.

FIG. 23 shows the same basic feedback system architecture as in FIG. 21 for the case of a CT 210 with two differential secondary windings 211 and 212 carrying only a small fraction of the common mode current, but carrying the full normal mode current. Small unbalances between the differential windings 211 and 212 will result in imperfect cancellation of the normal mode current, and will yield a relatively large unwanted normal mode signal at the secondary, in addition to the "desired" common mode signal. The unwanted normal mode signal distorts the desired feedback signal, and upsets the operation of the active filter.

Figure 24:
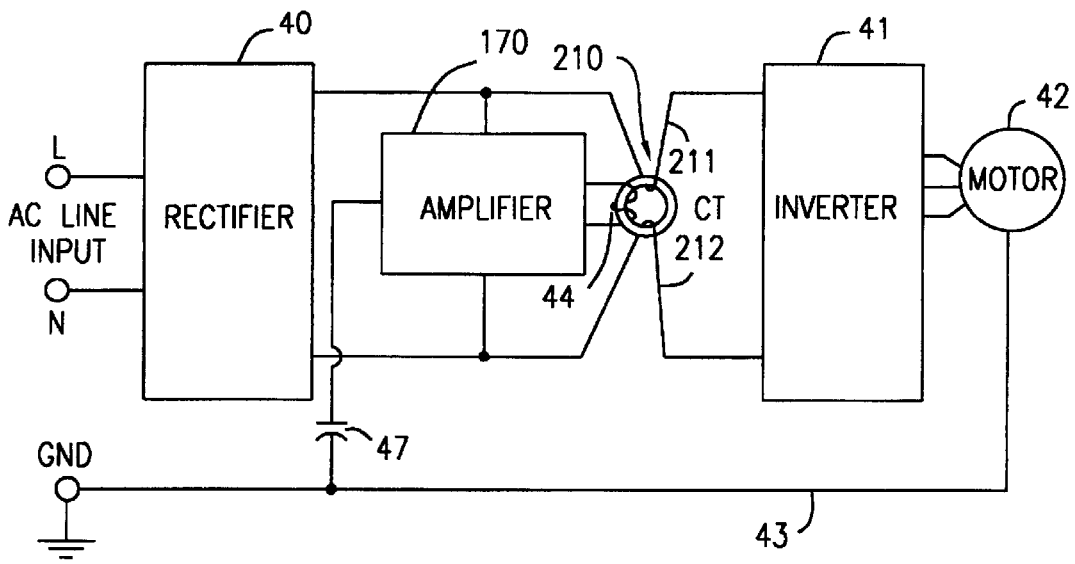
FIG. 24 shows the architecture of FIG. 22 with a differential transformer.

FIG. 24 shows the same basic proposed feed forward system architecture as in FIG. 22, and the differential primary windings 211 and 212 of the CT 210 carry the full common mode current, as well as the full normal mode current. Thus the ratio of unwanted normal mode signal at the secondary 44 of the transformer (caused by imperfect cancellation between the two primary windings), to the wanted common mode signal, is now much lower, (because the common mode signal is much higher). Any residual normal mode signal thus has a relatively much smaller distorting effect on the output of the amplifier.

A potential design problem with the architecture of FIG. 22 is that to obtain good cancellation of the ground current, the input/output current characteristic of the amplifier 170 must be linear, and it must have as close to unity gain and as small a phase lag as possible. MOSFETs are potentially better candidates than bipolar transistors for devices $Q_1$ and $Q_2$, because of their minor propagation delays, as well as their better SOA.

Linearization of the transfer characteristic can be largely achieved through the use of MOSFET source followers, in conjunction with a standing d-c bias that offsets the gate threshold voltage. Additional "linearizing" feedback around the amplifier can also be added to correct against residual non-linearity and propagation delays. This added feedback does not require high gain, therefore it does not invite closed-loop instability.

Figure 25:
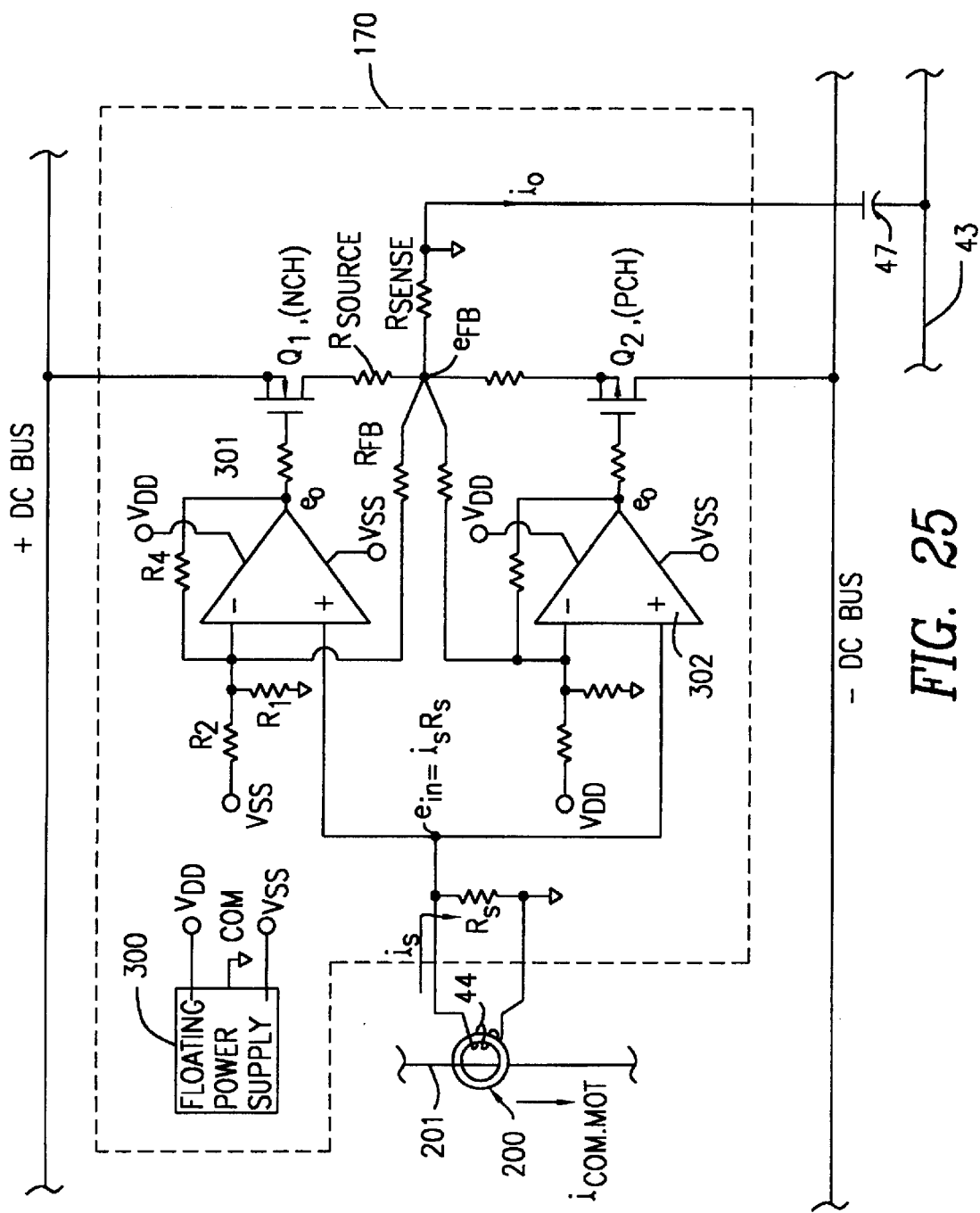
FIG. 25 shows the novel active filter of the present invention using power MOSFETs instead of bipolar transistors for devices $Q_1$ and $Q_2$.

A basic amplifier circuit implementation employing N channel MOSFET transistor $Q_1$ and P channel MOSFET transistor $Q_2$ is shown in FIG. 25. In FIG. 25, components similar to those of the prior Figures have the same identifying numeral. A floating power supply 300 is provided to supply biases $V_{DD}$ and $V_{SS}$. The circuit components are easily integrated into a chip 170 as shown in dotted line outline. Amplifiers 301 and 302 drive N channel MOSFET $Q_1$ and P-channel MOSFET $Q_2$ respectively, and provide respective positive and negative d-c bias voltages that offset the gate threshold voltages of the MOSFETs.

Consider amplifier 301, and assume that resistor $R_{FB}$ is open. The output voltage of amplifier 301, shown as $e_o$, is:

$$eo = i_S R_S (1+B) + \frac{R_4 |V_{SS}|}{R_2} \quad (1)$$

where $i_S$ is the output of winding 44, and $R_S$, $R_1$, $R_2$, $R_4$, and $V_{SS}$ are shown in FIG. 25, and $$B = \left(1 + \frac{R_4}{R_1} + \frac{R_4}{R_2}\right)$$

R2 is selected so that:

$$\frac{R_4 |V_{SS}|}{R2} = Vgth, \text{ where}$$

Vgth is the gate threshold voltage of MOSFET $Q_1$. Thus the output voltage of amplifier 301 has a standing d-c bias that substantially cancels the threshold voltage of MOSFET $Q_1$.

The output current, $i_O$, of the source follower circuit comprising $Q_1$, $R_{SOURCE}$, $R_{SENSE}$ is:

$$i_o = \frac{i_S R_S (1+B)}{R_{SOURCE} + R_{SENSE}} \times \left(\frac{1 + gfs(R_{SOURCE} + R_{SENSE})}{gfs(R_{SOURCE} + R_{SENSE})}\right) \quad (2)$$

If $gfs \cdot (R_{SOURCE} + R_{SENSE}) \gg 1$, then equation (2) approximates to:

$$i_o = \frac{i_S R_S (1+B)}{R_{SOURCE} + R_{SENSE}} \quad (3)$$

Equation (3) shows that $i_O$ is proportional to $i_S$. This of course is based on the assumptions that (a) Vgth is exactly canceled by $$\frac{R_4|V_{SS}|}{R_2}$$

and (b) gfs $(R_{SOURCE}+R_{SENSE}) \gg 1$.

In practice, some degree of non-linearity between $i_O$ and $i_S$ will occur. This non-linearity is reduced by the feedback circuit comprising $R_{SENSE}$ and $R_{FB}$.

$R_{SENSE}$ is chosen so that $e_{FB}(=i_O \cdot R_{SENSE})$ is nominally equal to $e_{in}(=i_S \cdot R_S)$. i.e. $e_{FB}$ nominally tracks $e_{in}$. If $e_{FB}$ exactly tracks $e_{in}$, then the voltage across $R_{FB}$ will be zero, no current will flow in $R_{FB}$, and the feedback circuit has no modifying effect.

If $(i_O \cdot R_{SENSE})$ becomes greater than $(i_S \cdot R_S)$, feedback current flows through $R_{FB}$, towards the negative input terminal of amplifier 301; this has the effect of decreasing $e_o$, thus reducing the error.

Conversely, if $(i_O \cdot R_{SENSE})$ becomes less than $(i_S \cdot R_S)$, feedback current flows through $R_{FB}$, away from the negative input terminal of amplifier 301; this has the effect of increasing $e_o$, thus reducing the error.

Consider next the CT 200 and designate its numbers of primary and secondary turns as $N_p$ and $N_s$ respectively.

Returning to equation (3), and substituting $$\frac{N_P}{N_S} i_{COM\,MOT}$$

for $i_S$:

$$i_o = \left(\frac{N_P}{N_S} \frac{R_S(1+B)}{R_{SOURCE} + R_{SENSE}}\right) i_{COM\,MOT} \quad (4)$$

By appropriate choice of resistor values and $N_S$ (secondary turns of the CT 200):

$$\frac{N_P}{N_S} \frac{R_S(1+B)}{R_{SOURCE} + R_{SENSE}} = 1.0$$

and equation (4) becomes:

$i_O = i_{COM\,MOT}$

This is the required design condition for $i_{GND}=0$.

The design principles for the amplifier circuit 302, which drives MOSFET Q2, are similar.

It is desirable that MOSFETs $Q_1$ and $Q_2$ are automatically biased, so that a small standing d-c bias current flows through these transistors, from the positive d-c bus to the negative d-c bus. This will ensure that these transistors are biased just to the point of conduction, thereby minimizing crossover distortion of the output current $i_O$.

Some form of closed-loop control of the d-c bias point of MOSFETs $Q_1$ and $Q_2$ is thus required, (a) to maintain a small standing bias current, which is sufficient to avoid crossover distortion, but small enough to avoid significant d-c dissipation in MOSFETs $Q_1$ and $Q_2$, and (b) to maintain the potential of the common point of the floating supply 300 that powers amplifiers 301 and 302 at approximately the midpoint potential between the positive and negative d-c busses, thus ensuring operating headroom as well as substantially equal dissipation and voltage sharing for MOSFETs $Q_1$ and $Q_2$.

Figure 26:
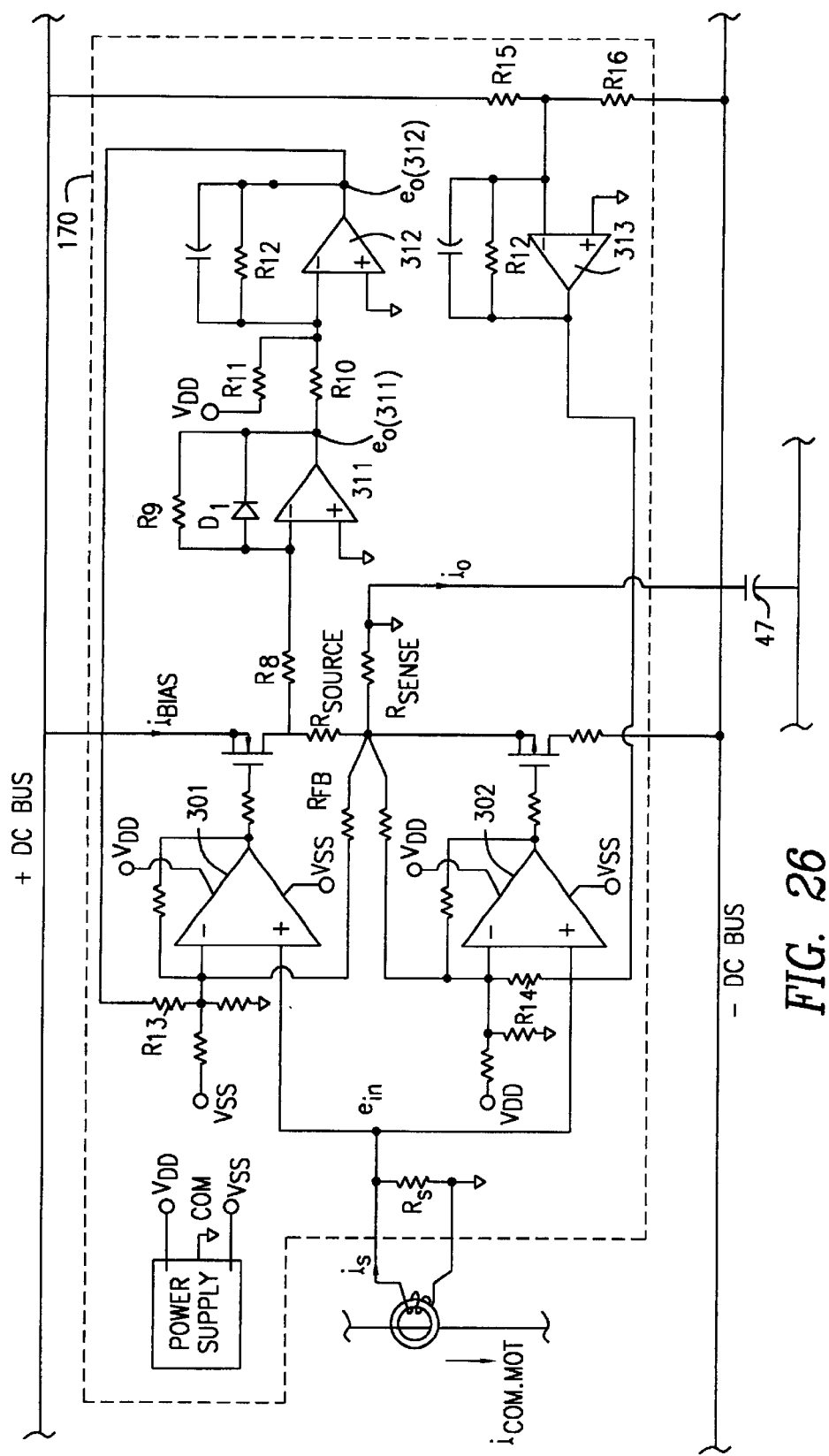
FIG. 26 is an improvement of FIG. 25, adding further control elements.

FIG. 26 shows the added circuits which perform these functions. In FIG. 26, amplifiers 311, 312 and 313 are added to the circuit of FIG. 25 and may be included within the IC chip 170. Thus, referring to FIG. 26, Amplifier 311 senses and amplifies the voltage across $R_{SOURCE}+R_{SENSE}$. During "passive" periods, when $i_O$ is zero, the voltage across $R_{SENSE}$ is zero, and the voltage across $R_{SOURCE}$ is due to standing d-c bias current, $i_{BIAS}$, that flows from the positive d-c bus to the negative d-c bus, via MOSFETs $Q_1$ and $Q_2$.

During the passive periods, the output voltage of amplifier 311 thus represents an amplified inverted version of the voltage across $R_{SOURCE}$, which itself represents the standing d-c bias current through MOSFET$Q_1$. The output voltage of amplifier 311 due to the bias current is less than, but close to, the forward threshold voltage of diode D1. This diode therefore does not conduct during the passive periods.

During the active periods, when output current $i_O$ flows through MOSFET $Q_1$, the voltage at the output of amplifier 311 quickly tries to exceed the forward threshold voltage diode of D1, but is clamped to this voltage. The duty cycle of the active periods is very low relative to the passive periods, and thus the average output voltage of amplifier 311 essentially just represents the standing d-c bias voltage across $R_{SOURCE}$, inverted and multiplied by the gain of amplifier 311:

$$e_0(311) = -\frac{R9}{R8} i_{BIAS} \cdot R_{SOURCE}$$

The output voltage of amplifier 312 then becomes:

$$e_0(312) = -V_{DD}\frac{R12}{R11} - e_{0(311)}\frac{R12}{R10}$$

$$= -(e_0(311)REF + e_0(312))\frac{R12}{R10}$$

$$= -\left(e_0(311)REF - \frac{R9}{R8} i_{BIAS} \cdot R_{SOURCE}\right) \cdot \frac{R12}{R10}$$

where $e_0(311)REF = V_{DD}\frac{R10}{R11}$, and $e_o(311)$REF represents the desired fixed reference value for the standing d-c bias current, $i_{BIAS}$, and;

$e_{o(312)}$, thus represents the amplified error between the desired and actual d-c bias current.

This error voltage is fed to the input of amplifier 301, via R13, such that, in addition to its other functions, amplifier 301 regulates $i_{BIAS}$ to essentially the set reference level. Note that $i_{BIAS}$ must of necessity also flow in MOSFET $Q_2$, since the capacitor 47 blocks the flow of any d-c current through $R_{SENSE}$.

It remains now to add a means for regulating the common point of the floating power supply substantially to the midpoint potential between the positive and negative d-c bus voltages. This function is carried out by amplifier 313 which amplifies the difference between the positive and negative bus voltages, sensed by resistors R15 and R16 respectively. The amplified difference voltage is fed as an input to amplifier 302, via resistor R14, such that, in addition to its other functions, amplifier 302 regulates the common point of the floating power supply substantially to the midpoint potential between the positive and negative bus voltages.

The novel invention as described above enables the production of a motor drive circuit which can reduce conductive emission noise and meet the requirements of Class A and Class B motor drives. A further advantage of the novel invention is that ground leak current is reduced to eliminate fault trip of the circuit due to excessive ground current. The reduction of ground leak current is of great importance for the drive of compressor motors using high dielectric constant cooling materials such as R410A which will have an increased capacitance from motor frame to ground.

Figure 27:
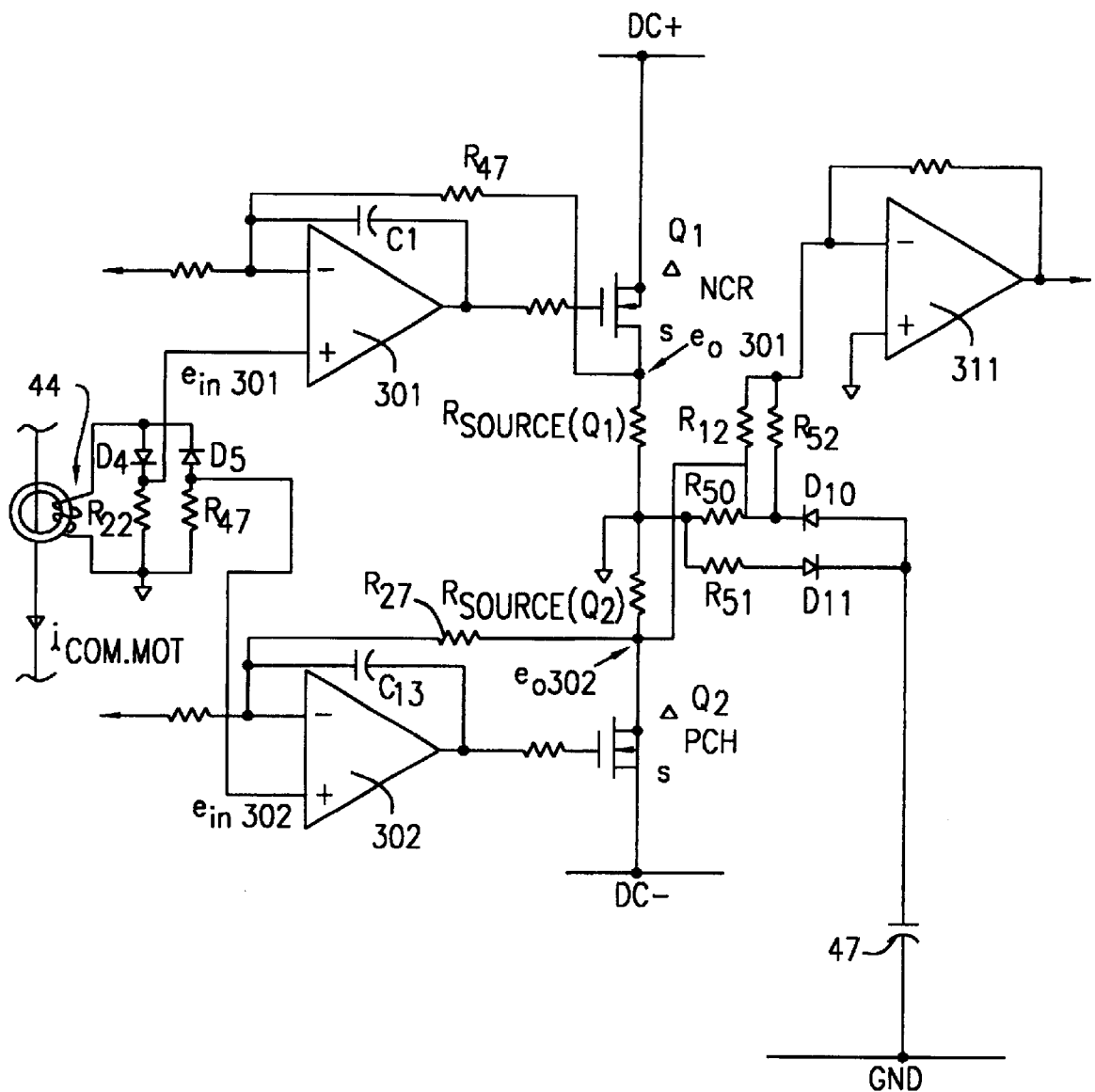
FIG. 27 shows a modification of the circuit of FIG. 26 for improved control of the quiescent bias current.
Figure 28:
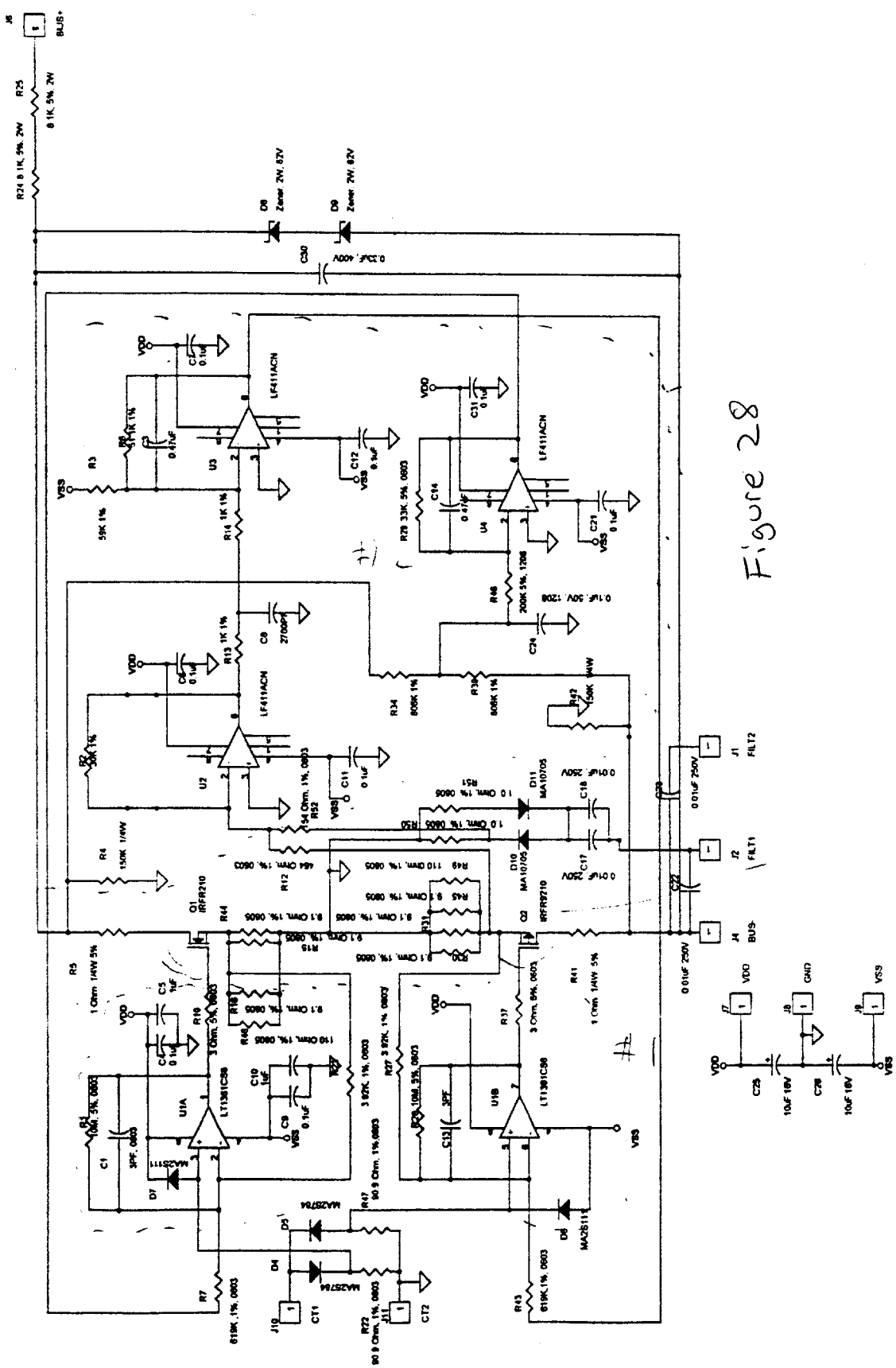
FIG. 28 shows a full circuit diagram of a preferred embodiment of the common mode filter of the invention.

FIG. 27 shows modifications in the circuit of FIG. 26 in which the feedback circuit for quiescent bias current is revised; and FIG. 28 is a detailed overall circuit diagram of the common mode filter of the invention. Referring to FIGS. 27 and 28, the main feedback loop around the amplifiers 301 and 302 is now via R23 and R27 to the sources of transistors $Q_1$ and $Q_2$ respectively. This feedback, directly to the sources of the MOSFETs, essentially forces the voltages $e_{o301}$ and $e_{o302}$ to follow the input voltages $e_{in}$ 301 and $e_{in}$ 302 respectively, overcoming the nonlinear transfer characteristics of the MOSFETs $Q_1$ and $Q_2$, capacitors C1 and c13 prevent unwanted oscillation of amplifiers 301 and 302 respectively. Overall linearity between $e_o$ and $e_{in}$, for each amplifier is significantly improved, versus that obtained with the circuit of FIG. 26.

With the above arrangement of feedback resistor connected directly to the source of the MOSFET, there is no feedback resistor directly around the amplifier itself. Thus the output of amplifier 301 will saturate if $e_{in}$ 301 goes negative, because transistor $Q_1$ cannot replicate negative input current, and the output of amplifier 302 would saturate if $e_{in}$ 302 goes positive, because transistor $Q_2$ cannot replicate positive input current.

Separate "allowed polarity only" inputs are derived via diode D4 and R22 for amplifier 301, and diode D5 and R47 for amplifier 302. $e_{in}$ 301 is positive during the positive period of $i_{com\ mot}$, and zero during negative periods. $e_{in}$ 302 is negative during negative periods of $i_{com\ mot}$, and zero during positive periods.

Thus the output voltage of amplifier 301 does not saturate when $i_{com\ mot}$ is negative, since it receives no input during this period; instead, it stays essentially at the threshold voltage of $Q_1$. Likewise, the output voltage of amplifier 302 stays essentially at the threshold voltage of $Q_2$ when $i_{com\ mot}$ is positive. Thus the outputs of each of these amplifiers remain at the desired MOSFET gate threshold level during their idle periods, ready to drive current in their respective MOSFETs at the crossover points of $i_{com\ mot}$, with minimal crossover distortion.

Note that the secondary winding 44 of the current-sensing transformer is essentially a current source. The voltage across R22 is therefore directly proportional to $i_{com\ mot}$, when this is positive. The voltage across R47 is directly proportional to $i_{com\ mot}$, when this is negative. The voltage drops across diodes D4 and D5 do not distort the current waveform, not introduce any significant distortion of the current-dependent signals across R22 and R47.

Amplifiers 311 and 312 in FIG. 26 regulate the quiesent bias current via resistor R13, amplifier 301 and MOSFET $Q_1$. The amplifier 313 in FIG. 26 regulates the potential at the common point of the source resistors via resistor R14, amplifier 302 and MOSFET $Q_2$. These functions are reversed in the circuit of FIG. 28. Amplifiers U2 and U3 (equivalent to amplifiers 311 and 312) regulate the quiescent current via R43 and amplifier U1B (equivalent to 302) and $Q_2$. Amplifier U4 (equivalent to 313) regulates the potential at the common point of the source resistors via resistor R7, amplifier U1A (equivalent to 301) and $Q_1$. The swapping of these functions between $Q_1$ and $Q_2$ does not change the basic principle but the arrangement of FIG. 28 has been found to be better in practice.

With reference to FIG. 26 the clamping diode D1 across the amplifier 311 is one way of mitigating unwanted output voltage of amplifier 311 when output current flows through $Q_1$ to ground via 47. Ideally, however, the output of amplifier 311 should always represent just the quiescent bias current, without any superimposed component of the output current, and should not change during the pulses of output current. In practice, this method of FIG. 26 of "clamping out" the output current component from the quiescent current feedback signal at the output of amplifier 311 generally does not allow sufficiently accurate regulation of the quiescent bias current, because the quiescent bias current feedback signal is corrupted to some degree during each pulse of output current.

In the circuits of FIGS. 27 and 28, components R50, R51, R52, D10 and d11 are added to solve this problem. Thus, voltage proportional to the output current carried by transistor $Q_2$ is developed across R50. This voltage is applied as a second input to amplifier 311/U2, via R52, so that it exactly cancels the voltage developed across $R_{SOURCE(Q2)}$ (R30 etc), caused by the output current component, which is applied to the input of amplifier 311 (U2) via R12. The net input to amplifier 311 (U2), via the combination of R12 and R52, is thus due only to the quiesent bias current that flows through $R_{SOURCE(Q2)}$ and $Q_2$. It does not flow at the output into R50 or R51. The output of 311 (U2) now stays constant at a level that represents just the quiescent bias current, whether or not output current is flowing. With this arrangement, the clamping diode D1 in FIG. 26 is no longer needed.

Although the present invention has been described in relation to particular embodiments thereof, many other variations and modifications and other uses will become apparent to those skilled in the art. It is preferred, therefore, that the present invention be limited not by the specific disclosure herein.

What is claimed is:

1. An active filter for reducing a common mode current in a pulse width modulated motor drive circuit; said motor drive circuit comprising an a-c source, a rectifier connected to said a-c source and producing a rectified output voltage connected to a positive d-c bus and a negative d-c bus, a PWM inverter having input terminals coupled to said positive d-c bus and negative d-c bus and having a controlled a-c output, a motor driven by said a-c output of said PWM inverter, a ground wire extending from said motor, and a current sensor for measuring the common mode current in said drive circuit in said ground wire, said current sensor producing an output current related to said common mode current;

said active filter comprising a first and second transistor, each having first and second main electrodes and a control electrode, and at least one first buffer amplifier; said first electrode of said first and second transistor coupled to a common node, said second electrodes of said first and second transistors being coupled to said positive d-c bus and said negative d-c respectively; said at least one first buffer amplifier having an input coupled to said output of said current sensor and an output connected to at least one of said control electrodes; and a d-c isolating capacitor connecting said common node of said first electrode of said first and second transistors to said ground wire, said current sensor being coupled such that the current sensor is in a current loop comprising said active filter, said d-c bus, said PWM inverter, said motor, said ground wire and said capacitor.

2. The device of claim 1, wherein said current sensor is a differential current transformer having first and second windings connected in series with said positive and negative d-c busses respectively and an output winding for producing said output current related to said common mode current.

3. The device of claim 1, wherein said current sensor is a current transformer having a primary winding connected in series with said ground wire and a secondary winding for producing said output current related to said common mode current.

4. The device of claim 2, wherein said current transformer has a toroidal core.

5. The device of claim 3, wherein said current transformer has a toroidal core and wherein said primary winding is a single turn on said toroidal core.

6. The device of claim 1, wherein said first and second transistors are complementary NPN and PNP bipolar transistors and their said first electrodes are emitter electrodes.

7. The device of claim 1, wherein said first and second transistors are complementary N and P channel power MOSFETs and wherein said first electrodes are source electrodes.

8. The device of claim 1, wherein said current sensor is a differential current transformer having first and second windings connected in respective ones of lines of said a-c source connected to said rectifier and an output winding for producing said output current related to said common mode current.

9. The device of claim 1 which further includes a headroom voltage control circuit coupled to said first and second transistors for maintaining sufficient voltage between the first and second electrodes of each transistor to permit linear amplification operation of each transistor over substantially the full rectified cycle of said a-c source.

10. The device of claim 9, wherein said headroom voltage control circuit includes first and second resistors which are respectively connected in parallel with said first and second transistors.

11. The device of claim 9, wherein said headroom voltage control circuit comprises respective active clamp circuits connected to said first and second transistors respectively for preventing the reduction of headroom voltage for each of said transistors below a given value.

12. The device of claim 9, wherein said headroom control circuit comprises a first circuit for generating a midpoint potential which is the midpoint of the d-c potential between said positive and negative d-c busses and a second amplifier having an input connected to a potential comprising a difference between said midpoint d-c voltage and the voltage at the common node of said first and second transistors and an output connected to an input of said first buffer amplifier for actively regulating an average voltage at said common node to said midpoint voltage.

13. The device of claim 1, which further includes a reduced voltage positive filter bus coupled to said d-c bus; said second electrodes of said first and second transistors connected to said reduced voltage positive filter d-c bus and said negative d-c bus respectively.

14. The device of claim 13 which further includes a series connected resistor and zener diode connected between said positive and negative d-c busses; said positive d-c filter bus connected to the node between said resistor and said zener diode.

15. The device of claim 13 which further includes a first and second series connected capacitor connected across said positive and negative d-c busses; and said d-c filter bus connected to the node between said first and second capacitors.

16. The device of claim 15, wherein said rectifier comprises a voltage doubler circuit which includes two series connected diodes connected across said positive and negative d-c Busses and in parallel with said first and second capacitors; and said a-c source connected to the nodes between said diodes and said capacitors.

17. The device of claim 1, wherein said buffer amplifier has at least first and second power supply inputs, and a power supply circuit for applying bias voltages to said buffer amplifier inputs; said power supply circuit comprising first and second current sources and first and second zener diodes; the anode of said first zener diode connected to the cathode of said second zener diode at a first node; said cathode of said first zener diode connected to one terminal of said first current source; said anode of said second zener diode connected to one terminal of said second current source; the second terminal of said first and second current sources being coupled to said positive and negative d-c busses respectively; the node between said first current source and said first zener diode connected to said first power supply input; and the node between said second current source and said second zener diode connected to said second power supply input.

18. The device of claim 3, wherein said dc isolating capacitor is connected to said ground wire at a point disposed between said primary winding of said current transformer and said motor.

19. The device of claim 3, wherein said primary winding of said current transformer is disposed between said motor and a common node connecting said dc isolating filter capacitor and said ground wire.

20. The device of claim 1, wherein said first and second transistor and said buffer amplifier are formed in a common integrated circuit chip.

21. The device of claim 9, wherein said first and second transistors and said buffer amplifier and said headroom control circuits are formed in a common integrated circuit.

22. The device of claim 14, wherein said first and second transistors and said buffer amplifier and said series connected resistor and a zener diode are formed in a common integrated circuit.

23. The device of claim 17, wherein said first and second transistors and said buffer amplifier and said power supply circuit are formed in a common integrated circuit.

24. The device of claim 1, wherein said current sensor is connected in said ground wire.

25. The device of claim 1, wherein said current sensor comprises a current transformer having at least one primary winding and a secondary winding; said secondary winding being connected to said input of said buffer amplifier; said at least one primary winding connected between said positive d-c bus and said second electrode of said first transistor, thereby to define a feedback architecture.

26. The device of claim 1, wherein said current sensor comprises a current transformer having at least one primary winding and a secondary winding; said secondary winding being connected to said input of said buffer amplifier; said at least one primary winding connected between one of said input terminals of said inverter and said second electrode of said first transistor, thereby to define a feed forward architecture.

27. The device of claim 2, wherein said current transformer has a toroidal core and wherein said first and second windings are each a single turn.

28. The device of claim 3, wherein said common node between said d c isolating capacitor and said ground wire is disposed between said primary winding of said current transformer and said motor.

29. The device of claim 3, wherein said primary winding of said current transformer is disposed between said common node between said d-c isolating filter capacitor and said ground wire and said motor.

30. The device of claim 1, which further includes a reduced voltage filter bus coupled to one of said positive or negative voltage bus; said second electrodes of said first and second transistors connected to said reduced voltage filter bus.

31. The device of claim 30, wherein said reduced voltage filter bus is connected to said negative voltage bus.

32. The device of claim 26, wherein said first and second transistors are MOSFETs; and which further includes a quiescent bias current circuit coupled to one of said control electrode of one of said first and second transistors, and a regulation circuit connected to said bias current circuit for regulating the quiescent bias current to maintain the quiescent gate voltage of said MOSFET transistors at their threshold voltage, thereby to eliminate cross-over distortion of the output current of said MOSFETs.

33. An active filter for reducing a common mode current in a pulse width modulated motor drive circuit; said motor drive circuit comprising an a-c source, a rectifier connected to said a-c source and producing a rectified output voltage connected to a positive d-c bus and a negative d-c bus, a PWM inverter having input terminals coupled to said positive d-c bus and negative d-c bus and having a controlled a-c output, a motor driven by said a-c output of said PWM inverter, a ground wire extending from said motor, and a current sensor for measuring the common mode current in said drive circuit, said current sensor producing an output current related to said common mode current;

said active filter comprising a first and second transistor, each having first and second main electrodes and a control electrode, said first electrode of said first and second transistor coupled to a common node, said second electrodes of said first and second transistors being connected to said positive d-c bus and said negative d-c bus respectively; and a d-c isolating capacitor connecting said common node of said first electrode of said first and second transistors to said ground wire;

said current sensor comprising a differential current transformer having first and second windings connected in series with said positive and negative d-c busses respectively and an output winding for producing said output current related to said common mode current; said output winding being coupled to said control electrodes; said active filter comprising a circuit having an architecture comprising a feed forward system with unity amplification by said current transformer and said transistors, said current sensor being coupled such that the current sensor is in a current loop comprising said active filter, said d-c bus, said PWM inverter, said motor, said ground wire and said capacitor.

34. The device of claim 33, wherein said current transformer has a toroidal core.

35. The device of claim 33 which further includes a headroom voltage control circuit coupled to said first and second transistors for maintaining sufficient voltage between the first and second electrodes of each transistor to permit linear amplification operation of each transistor over substantially the full rectified cycle of said a-c source.

36. The device of claim 33 further including a reduced voltage positive filter bus coupled to said dc bus; said second electrodes of said first and second transistors connected to said reduced voltage positive filter dc bus and said negative dc bus respectively.

37. The device of claim 33, wherein said first and second transistors are formed in a common integrated circuit chip.

38. The device of claim 33, wherein said first and second transistors and said headroom control circuits are formed in a common integrated circuit.

39. The device of claim 33, wherein said isolating capacitor is indirectly connected to said common node of said first electrode of said first and second transistors.

40. The device of claim 33, wherein said sensed common mode current is converted to a voltage and provided to said active filter as a voltage signal.

41. The device of claim 33, wherein said sensed common mode current is sensed and provided to said active filter as a current signal.

42. An active filter for reducing a common mode current in a pulse width modulated motor drive circuit; said motor drive circuit comprising an a-c source, a rectifier connected to said a-c source and producing a rectified output voltage connected to a positive d-c bus and a negative d-c bus, a PWM inverter having input terminals coupled to said positive d-c bus and negative d-c bus and having a controlled a-c output, a motor driven by said a-c output of said PWM inverter, a ground wire extending from said motor, and a current sensor for measuring the common mode current in said drive circuit, said current sensor producing an output current related to said common mode current;

said active filter comprising a first and second transistor each having first and second main electrodes and a control electrode, said first electrode of said first and second transistor coupled to a common node, said second electrodes of said first and second transistors being connected to said positive d-c bus and said negative d-c respectively; said current sensor output coupled to at least one of said control electrodes; and a d-c isolating capacitor connecting said common node of said first electrode of said first and second transistors to said ground wire; and a headroom voltage control circuit coupled to said first and second transistors for maintaining sufficient voltage between the first and second electrodes of said transistors to permit linear amplification operation of said transistors over substantially the full rectified cycle of said a-c source, said current sensor being coupled such that the current sensor is in a current loop comprising said active filter, said d-c bus, said PWM inverter, said motor, said ground wire and said capacitor.

43. The device of claim 42, wherein said headroom voltage control circuit includes first and second resistors which are respectively connected in parallel with said first and second transistors.

44. The device of claim 42, wherein said headroom voltage control circuit comprises respective active clamp circuits connected to said first and second transistors respectively for preventing the reduction of headroom voltage for each of said transistors below a given value.

45. The device of claim 42, which further includes a reduced voltage positive filter bus coupled to said d-c bus; said second electrodes of said first and second transistors connected to said reduced voltage positive filter d-c bus and said negative d-c bus respectively.

46. The device of claim 45 to which further includes a series connected resistor and zener diode connected between said positive and negative d-c busses; and positive d-c filter bus connected to the node between said resistor and said zener diode.

47. The device of claim 45 which further includes a first and second series connected capacitor connected across said positive and negative d-c bussesl abd said d-c filter bus connected to the node between said first and second capacitors.

48. An active filter for reducing a common mode current in a pulse width modulated motor drive circuit said motor drive circuit comprising an a-c source, a rectifier connected to said a-c source and producing a rectified output voltage connected to a positive d-c bus and a negative d-c bus, a PWM inverter having input terminals coupled to said positive d-c bus and negative d-c bus and having a controlled a-c output, a motor driven by said a-c output of said PWM inverter, a ground wire extending from said motor, and a current sensor for measuring the common mode current in said drive circuit, said current sensor producing an output current related to said common mode current;

said active filter comprising a first and second transistor, each having first and second main electrodes and a control electrode, said first electrode of said first and second transistor coupled to a common node, said second electrodes of said first and second transistors being coupled to said positive d-c bus and said negative d-c bus respectively; said current sensor output being coupled to at least one of said control electrodes; a d-c isolating capacitor connecting said common node of said first electrode of said first and second transistors to said ground wire; and a reduced voltage filter bus coupled to said d-c bus; said second electrode of said first transistor being connected to said reduced voltage filter bus, and wherein said reduced voltage filter bus has a reduced positive voltage bus and a reduced negative voltage bus, one of said reduced positive voltage bus and said reduced negative voltage bus being connected in common with a corresponding one of said positive d-c bus and negative d-c bus, said current sensor being coupled such that the current sensor is in a current loop comprising said active filter, said d-c bus, said PWM inverter, said motor, said ground wire and said capacitor.

49. The device of claim 48 which further includes a series connected resistor and zener diode connected between said positive and negative d-c busses; said positive d-c filter bus connected to the node between said resistor and said zener diode.

50. The device of claim 48 which further includes a first and second series connected capacitor connected across said positive and negative d-c busses; and said d-c filter bus connected to the node between said first and second capacitors.

51. The device of claim 50, wherein said rectifier comprises a voltage doubler circuit which includes two series connected diodes connected in parallel with said first and second capacitors; and said a-c source connected to the nodes between said diodes and said capacitors.

52. An active filter for reducing a common mode current in a pulse width modulated motor drive circuit; said motor drive circuit comprising an a-c source, a rectifier connected to said a-c source and producing a rectified output voltage connected to a positive d-c bus and a negative d-c bus, a PWM inverter having input terminals coupled to said positive d-c bus and negative d-c bus and having a controlled a-c output, a motor driven by said a-c output of said PWM inverter, a ground wire extending from said motor, and a current sensor for measuring the common mode current in said drive circuit, said current sensor producing an output current related to said common mode current;

said active filter comprising a first and second transistor, each having first and second main electrodes and a control electrode, said first electrode of said first and second transistor coupled to a common node, said second electrodes of said first and second transistors being connected to said positive d-c bus and said negative d-c bus respectively; and a d-c isolating capacitor connecting said common node of said first electrode of said first and second transistors to said ground wire;

said current sensor comprising a differential current transformer sensing current in said ground wire and producing an output current related to said common mode current; said output current being supplied to said control electrodes; said active filter comprising a circuit having an architecture comprising a feed forward system with unity amplification by said current transformer and said transistors, said current sensor being coupled such that the current sensor is in a current loop comprising said active filter, said d-c bus, said PWM inverter, said motor, said ground wire and said capacitor.

53. An active filter for reducing a common mode current in a pulse width modulated drive circuit for driving a load; said drive circuit comprising an a-c source, a rectifier connected to said a-c source and producing a rectified output voltage connected to a positive d-c bus and a negative d-c bus, a PWM inverter having input terminals coupled to said positive d-c bus and negative d-c bus and having a controlled a-c output for driving the load, a ground wire extending from said load, and a current sensor for measuring the common mode current in said drive circuit in said ground wire, said current sensor producing an output current related to said common mode current;

said active filter comprising a first and second transistor, each having first and second main electrodes and a control electrode, and at least one first buffer amplifier; said first electrode of said first and second transistor coupled to a common node, said second electrodes of said first and second transistors being coupled to said positive d-c bus and said negative d-c respectively; said at least one buffer amplifier having an input coupled to said output of said current sensor and an output connected to at least one of said control electrodes; and a d-c isolating capacitor connecting said common node of said first electrode of said first and second transistors to said ground wire, said current sensor being coupled such that the current sensor is in a current loop comprising said active filter, said d-c bus, said PWM inverter, said load, said ground wire and said capacitor.

54. The device of claim 53, wherein said current sensor is a differential current transformer having first and second windings connected in series with said positive and negative d-c busses respectively and an output winding for producing said output current related to said common mode current.

55. The device of claim 53, wherein said current sensor is a current transformer having a primary winding connected in series with said ground wire and a secondary winding for producing said output current related to said common mode current.

56. The device of claim 54, wherein said current transformer has a toroidal core.

57. The device of claim 55, wherein said current transformer has a toroidal core and wherein said primary winding is a single turn on said toroidal core.

58. The device of claim 53, wherein said first and second transistors are complementary NPN and PNP bipolar transistors and their said first electrodes are emitter electrodes.

59. The device of claim 53, wherein said first and second transistors are complementary N and P channel power MOSFETs and wherein said first electrodes are source electrodes.

60. The device of claim 53, wherein said current sensor is a differential current transformer having first and second windings connected in respective ones of lines of said a-c source connected to said rectifier and an output winding for producing said output current related to said common mode current.

61. The device of claim 53 which further includes a headroom voltage control circuit coupled to said first and second transistors for maintaining sufficient voltage between the first and second electrodes of each transistor to permit linear amplification operation of each transistor over substantially the full rectified cycle of said a-c source.

62. The device of claim 61, wherein said headroom voltage control circuit includes first and second resistors which are respectively connected in parallel with said first and second transistors.

63. The device of claim 61, wherein said headroom voltage control circuit comprises respective active clamp circuits connected to said first and second transistors respectively for preventing the reduction of headroom voltage for each of said transistors below a given value.

64. The device of claim 61, wherein said headroom control circuit comprises a first circuit for generating a midpoint potential which is the midpoint of the d-c potential between said positive and negative d-c busses and a second amplifier having an input connected to a potential comprising a difference between said midpoint d-c voltage and the voltage at the common node of said first and second transistors and an output connected to an input of said first buffer amplifier for actively regulating an average voltage at said common node to said midpoint voltage.

65. The device of claim 53, which further includes a reduced voltage positive filter bus coupled to said d-c bus; said second electrodes of said first and second transistors connected to said reduced voltage positive filter d-c bus and said negative d-c bus respectively.

66. The device of claim 65 which further includes a series connected resistor and zener diode connected between said positive and negative d-c busses; said positive d-c filter bus connected to the node between said resistor and said zener diode.

67. The device of claim 65 which further includes a first and second series connected capacitor connected across said positive and negative d-c busses; and said d-c filter bus connected to the node between said first and second capacitors.

68. The device of claim 67, wherein said rectifier comprises a voltage doubler circuit which includes two series connected diodes connected across said positive and negative d-c busses and in parallel with said first and second capacitors; and said a-c source connected to the nodes between said diodes and said capacitors.

69. The device of claim 53, wherein said buffer amplifier has at least first and second power supply inputs, and a power supply circuit for applying bias voltages to said buffer amplifier inputs; said power supply circuit comprising first and second current sources and first and second zener diodes; the anode of said first zener diode connected to the cathode of said second zener diode at a first node; said cathode of said first zener diode connected to one terminal of said first current source; said anode of said second zener diode connected to one terminal of said second current source; the second terminal of said first and second current sources being coupled to said positive and negative d-c busses respectively; the node between said first current source and said first zener diode connected to said first power supply input; and the node between said second current source and said second zener diode connected to said second power supply input.

70. The device of claim 55, wherein said d c isolating capacitor is connected to said ground wire at a point disposed between said primary winding of said current transformer and said load.

71. The device of claim 55, wherein said primary winding of said current transformer is disposed between said load and a common node connecting said d-c isolating filter capacitor and said ground wire.

72. The device of claim 53, wherein said first and second transistor and said buffer amplifier are formed in a common integrated circuit chip.

73. The device of claim 61, wherein said first and second transistors and said buffer amplifier and said headroom control circuits are formed in a common integrated circuit.

74. The device of claim 66, wherein said first and second transistors and said buffer amplifier and said series connected resistor and a zener diode are formed in a common integrated circuit.

75. The device of claim 69, wherein said first and second transistors and said buffer amplifier and said power supply circuit are formed in a common integrated circuit.

76. The device of claim 53, wherein said current sensor is connected in said ground wire.

77. The device of claim 53, wherein said current sensor comprises a current transformer having at least one primary winding and a secondary winding; said secondary winding being connected to said input of said buffer amplifier; said at least one primary winding connected between one of said input terminals of said inverter and said second electrode of said first transistor, thereby to define a feed forward architecture.

78. The device of claim 53, wherein said current sensor comprises a current transformer having at least one primary winding and a secondary winding; said secondary winding being connected to said input of said buffer amplifier; said at least one primary winding connected between said positive d-c bus and said second electrode of said first transistor, thereby to define a feedback architecture.

79. The device of claim 55, wherein said current transformer has a toroidal core and wherein said first and second windings are each a single turn.

80. The device of claim 56, wherein said d c isolating capacitor is connected to said ground wire at a point disposed between said primary winding of said current transformer and said load.

81. The device of claim 56, wherein said primary winding of said current transformer is disposed between said load and a common node connecting said d-c isolating filter capacitor and said ground wire.

82. The device of claim 53, which further includes a reduced voltage filter bus coupled to one of said positive or negative voltage bus; said second electrodes of said first and second transistors connected to said reduced voltage filter bus.

83. The device of claim 82, wherein said reduced voltage filter bus is connected to said negative voltage bus.

84. The device of claim 77, wherein said first and second transistors are MOSFETs; and which further includes a quiescent bias current circuit coupled to one of said control electrode of one of said first and second transistors, and a regulation circuit connected to said bias current circuit for regulating the quiescent bias current to maintain the quiescent gate voltage of said MOSFET transistors at their threshold voltage, thereby to eliminate cross-over distortion of the output current of said MOSFETs.

85. An active filter for reducing a common mode current in a pulse width modulated drive circuit for driving a load; said drive circuit comprising an a-c source, a rectifier connected to said a-c source and producing a rectified output voltage connected to a positive d-c bus and a negative d-c bus, a PWM inverter having input terminals coupled to said positive d-c bus and negative d-c bus and having a controlled a-c output for driving the load, a ground wire extending from said load, and a current sensor for measuring the common mode current in said drive circuit, said current sensor producing an output current related to said common mode current;

said active filter comprising a first and second transistor, each having first and second main electrodes and a control electrode, said first electrode of said first and second transistor coupled to a common node, said second electrodes of said first and second transistors being connected to said positive d-c bus and said negative d-c bus respectively; and a d-c isolating capacitor connecting said common node of said first electrode of said first and second transistors to said ground wire;

said current sensor comprising a differential current transformer having first and second windings connected in series with said positive and negative d-c busses respectively and an output winding for producing said output current related to said common mode current; said output winding being coupled to said control electrodes; said active filter comprising a circuit having an architecture comprising a feed forward system with unity amplification by said current transformer and said transistors, said current sensor being coupled such that the current sensor is in a current loop comprising said active filter, said d-c bus, said PWM inverter, said load, said ground wire and said capacitor.

86. The device of claim 85 wherein said current transformer has a toroidal core.

87. The device of claim 85 which further includes a headroom voltage control circuit coupled to said first and second transistors for maintaining sufficient voltage between the first and second electrodes of each transistor to permit linear amplification operation of each transistor over substantially the full rectified cycle of said a-c source.

88. The device of claim 85, further including a reduced voltage positive filter bus coupled to said d-c bus; said second electrodes of said first and second transistors connected to said reduced voltage positive filter d-c bus and said negative d-c bus respectively.

89. The device of claim 85, wherein said first and second transistors are formed in a common integrated circuit chip.

90. The device of claim 85, wherein said first and second transistors and said headroom control circuits are formed in a common integrated circuit.

91. An active filter for reducing a common mode current in a pulse width modulated drive circuit for driving a load; said drive circuit comprising an a-c source, a rectifier connected to said a-c source and producing a rectified output voltage connected to a positive d-c bus and a negative d-c bus, a PWM inverter having input terminals coupled to said positive d-c bus and negative d-c bus and having a controlled a-c output for driving the load, a ground wire extending from said load, and a current sensor for measuring the common mode current in said drive circuit, said current sensor producing an output current related to said common mode current;

said active filter comprising a first and second transistor each having first and second main electrodes and a control electrode, said first electrode of said first and second transistor coupled to a common node, said second electrodes of said first and second transistors being coupled to said positive d-c bus and said negative d-c respectively; said current sensor output coupled to at least one of said control electrodes; and a d-c isolating capacitor connecting said common node of said first electrode of said first and second transistors to said ground wire; and a headroom voltage control circuit coupled to said first and second transistors for maintaining sufficient voltage between the first and second electrodes of said transistors to permit linear amplification operation of said transistors over substantially the full rectified cycle of said a-c source, said current sensor being coupled such that the current sensor is in a current loop comprising said active filter, said d-c bus, said PWM inverter, said load, said ground wire and said capacitor.

92. The device of claim 91, wherein said headroom voltage control circuit includes first and second resistors which are respectively connected in parallel with said first and second transistors.

93. The device of claim 91, wherein said headroom voltage control circuit comprises respective active clamp circuits connected to said first and second transistors respectively for preventing the reduction of headroom voltage for each of said transistors below a given value.

94. The device of claim 91, which further includes a reduced voltage positive filter bus coupled to said d-c bus; said second electrodes of said first and second transistors connected to said reduced voltage positive filter d-c bus and said negative d-c bus respectively.

95. The device of claim 94 which further includes a series connected resistor and zener diode connected between said positive and negative d-c busses; said positive d-c filter bus connected to the node between said resistor and said zener diode.

96. The device of claim 94 which further includes a first and second series connected capacitor connected across said positive and negative d-c busses; and said d-c filter bus connected to the node between said first and second capacitors.

97. An active filter for reducing a common mode current in a pulse width modulated drive circuit for driving a load, said drive circuit comprising an a-c source, a rectifier connected to said a-c source and producing a rectified output voltage connected to a positive d-c bus and a negative d-c bus, a PWM inverter having input terminals coupled to said positive d-c bus and negative d-c bus and having a controlled a-c output for driving the load, a ground wire extending from said load, and a current sensor for measuring the common mode current in said drive circuit, said current sensor producing an output current related to said common mode current;

said active filter comprising a first and second transistor, each having first and second main electrodes and a control electrode, said first electrode of said first and second transistor coupled to a common node, said second electrodes of said first and second transistors being coupled to said positive d-c bus and said negative d-c bus respectively; said current sensor output being coupled to at least one of said control electrodes; a d-c isolating capacitor connecting said common node of said first electrode of said first and second transistors to said ground wire; and a reduced voltage filter bus coupled to said d-c bus; said second electrode of said first transistor being connected to said reduced voltage filter bus, and wherein said reduced voltage filter bus has a reduced positive voltage bus and a reduced negative voltage bus, one of said reduced positive voltage bus and reduced negative voltage bus being connected in common with a corresponding one of said positive d-c bus and negative d-c bus, said current sensor being coupled such that the current sensor is in a current loop comprising said active filter, said d-c bus, said PWM inverter, said load, said ground wire and said capacitor.

98. The device of claim 97 which further includes a series connected resistor and zener diode connected between said positive and negative d-c busses; said positive d-c filter bus connected to the node between said resistor and said zener diode.

99. The device of claim 97 which further includes a first and second series connected capacitor connected across said positive and negative d-c busses; and said d-c filter bus connected to the node between said first and second capacitors.

100. The device of claim 99 wherein said rectifier comprises a voltage doubler circuit which includes two series connected diodes connected in parallel with said first and second capacitors; and said a-c source connected to the nodes between said diodes and said capacitors.

101. An active filter for reducing a common mode current in a pulse width modulated drive circuit driving a load; said drive circuit comprising an a-c source, a rectifier connected to said a-c source and producing a rectified output voltage connected to a positive d-c bus and a negative d-c bus, a PWM inverter having input terminals coupled to said positive d-c bus and negative d-c bus and having a controlled a-c output for driving the load, a ground wire extending from said load, and a current sensor for measuring the common mode current in said drive circuit, said current sensor producing an output current related to said common mode current;

said active filter comprising a first and second transistor, each having first and second main electrodes and a control electrode, said first electrode of said first and second transistor coupled to a common node, said second electrodes of said first and second transistors being connected to said positive d-c bus and said negative d-c bus respectively; and a d-c isolating capacitor connecting said common node of said first electrode of said first and second transistors to said ground wire;

said current sensor comprising a current transformer sensing current in said ground wire and producing an output current related to said common mode current; said output current being supplied to said control electrodes; said active filter comprising a circuit having an architecture comprising a feed forward system with unity amplification by said current transformer and said transistors, said current sensor being coupled such that the current sensor is in a current loop comprising said active filter, said d-c bus, said PWM inverter, said load, said ground wire and said capacitor.

102. The device of claim 101, wherein said isolating capacitor is indirectly connected to said common node of said first electrode of said first and second transistor.

103. The device of claim 101, wherein said sensed common mode current is converted to a voltage and provided to said active filter as a voltage signal.

104. The device of claim 101, wherein said sensed common mode current is sensed and provided to said active filter as a current signal.

105. An active filter for reducing a common mode current in a pulse width modulated drive circuit for driving a load; said drive circuit comprising an a-c source, a rectifier connected to said a-c source and producing a rectified output voltage connected to a positive d-c bus and a negative d-c bus, a PWM inverter having input terminals coupled to said positive d-c bus and negative d-c bus and having a controlled a-c output for driving the load, a ground wire extending from said load, and a current sensor for measuring the common mode current in said drive circuit, said current sensor producing an output current related to said common mode current;

said active filter comprising a first and second transistor, each having first and second main electrodes and a control electrode, said first electrode of said first and second transistor coupled to a common node, said second electrodes of said first and second transistors being connected to said positive d-c bus and said negative d-c bus respectively; and a d-c isolating capacitor connecting said common node of said first electrode of said first and second transistors to said ground wire;

said current sensor comprising a differential current transformer having first and second windings connected in series with said positive and negative d-c busses respectively and an output winding for producing said output current related to said common mode current; said output winding being coupled to said control electrodes; said active filter comprising a circuit having an architecture comprising a feed forward system; said current sensor being coupled such that the current sensor is in a current loop comprising said active filter, said d-c bus, said PWM inverter, said load, said ground wire and said capacitor;

said feed forward system comprising said current transformer having said first and second windings connected in series with said positive and negative d-c buses, respectively, whereby said first and second windings are disposed between said active filter and said PWM inverter.

106. An active filter for reducing a common mode current in a pulse width modulated drive circuit driving a load; said drive circuit comprising an a-c source, a rectifier connected to said a-c source and producing a rectified output voltage connected to a positive d-c bus and a negative d-c bus, a PWM inverter having input terminals coupled to said positive d-c bus and negative d-c bus and having a controlled a-c output for driving the load, a ground wire extending from said load, and a current sensor for measuring the common mode current in said drive circuit, said current sensor producing an output current related to said common mode current;

said active filter comprising a first and second transistor, each having first and second main electrodes and a control electrode, said first electrode of said first and second transistor coupled to a common node, said second electrodes of said first and second transistors being directly connected to said positive d-c bus and said negative d-c bus respectively; and a d-c isolating capacitor connecting said common node of said first electrode of said first and second transistors to said ground wire;

said current sensor comprising a current transformer sensing current in said ground wire and producing an output current related to said common mode current; said output current being supplied to said control electrodes; said active filter comprising a circuit having an architecture comprising a feed forward system; said current sensor being coupled such that the current sensor is in a current loop comprising said active filter, said d-c bus, said PWM inverter, said load, said ground wire and said capacitor; said feed forward system comprising said current transformer having a primary disposed in said ground wire between said load and a connection of said isolating capacitor to said ground wire.

* * * * *